(12) United States Patent
Ogawa et al.

(10) Patent No.: US 11,929,006 B2
(45) Date of Patent: Mar. 12, 2024

(54) DISPLAY DEVICE

(71) Applicant: SONY GROUP CORPORATION, Tokyo (JP)

(72) Inventors: Ryo Ogawa, Tokyo (JP); Atsushi Takahashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/792,373

(22) PCT Filed: Dec. 18, 2020

(86) PCT No.: PCT/JP2020/047389
§ 371 (c)(1),
(2) Date: Jul. 12, 2022

(87) PCT Pub. No.: WO2021/149423
PCT Pub. Date: Jul. 29, 2021

(65) Prior Publication Data
US 2023/0029822 A1    Feb. 2, 2023

(30) Foreign Application Priority Data

Jan. 22, 2020    (JP) .................. 2020-008161

(51) Int. Cl.
*G09G 3/20*        (2006.01)
*G02B 27/01*       (2006.01)
*G06F 3/01*        (2006.01)

(52) U.S. Cl.
CPC ....... *G09G 3/2007* (2013.01); *G02B 27/0172* (2013.01); *G06F 3/013* (2013.01);
(Continued)

(58) Field of Classification Search
CPC ......... G09G 3/2007; G09G 2320/0238; G09G 2320/0686; G09G 2340/0428;
(Continued)

(56) References Cited

U.S. PATENT DOCUMENTS

2013/0265232 A1   10/2013   Yun
2015/0022542 A1    1/2015   Baba
(Continued)

FOREIGN PATENT DOCUMENTS

| JP | 2009-092810 | 4/2009 |
| JP | 2015-023381 | 2/2015 |
| JP | 2016-128893 | 7/2016 |

OTHER PUBLICATIONS

Miyake et al. Translation of JP 2009-092810, Apr. 30, 2009 (Year: 2009).*

(Continued)

*Primary Examiner* — Dmitriy Bolotin
(74) *Attorney, Agent, or Firm* — Sheridan Ross PC

(57) ABSTRACT

A display device of the present disclosure includes an image display device and a control unit, in which the image display device includes an image formation device, and an optical device that displays an image emitted from the image formation device in front of an observer while superimposing the image on a real image of an outside world, the control unit controls an operation of the image formation device, and in a case where a black display edge that is an edge of an area where black is displayed exists in the image, the control unit performs reversing processing and luminance increasing processing of the black display edge.

16 Claims, 25 Drawing Sheets

(52) U.S. Cl.
CPC ........... *G02B 2027/0174* (2013.01); *G09G 2320/0238* (2013.01); *G09G 2320/0686* (2013.01); *G09G 2340/0428* (2013.01); *G09G 2354/00* (2013.01); *G09G 2360/144* (2013.01)

(58) Field of Classification Search
CPC ......... G09G 2354/00; G09G 2360/144; G09G 2340/12; G09G 5/377; G09G 5/10; G09G 3/003; G09G 3/20; G02B 27/0172; G02B 2027/0174; G02B 2027/014; G02B 27/017; G02B 27/02; G06F 3/013; H04N 9/3173; H04N 9/3129; G06T 19/006
See application file for complete search history.

(56) References Cited

U.S. PATENT DOCUMENTS

| | | | | |
|---|---|---|---|---|
| 2015/0138224 A1* | 5/2015 | Kim | ........................ | G09G 3/38 345/592 |
| 2016/0117994 A1* | 4/2016 | Lee | ........................ | H04N 5/57 345/694 |
| 2018/0199005 A1* | 7/2018 | Sekiya | ........................ | G09G 5/32 |
| 2018/0276898 A1 | 9/2018 | Nishizawa | | |
| 2018/0292655 A1 | 10/2018 | Smithwick et al. | | |
| 2019/0237043 A1* | 8/2019 | Tahmasebi | ........................ | G09G 5/026 |
| 2019/0279407 A1 | 9/2019 | McHugh et al. | | |
| 2023/0154382 A1* | 5/2023 | Park | ........................ | G09G 3/2096 345/211 |
| 2023/0206513 A1* | 6/2023 | Pyles | ........................ | H04N 5/265 345/592 |

OTHER PUBLICATIONS

International Search Report and Written Opinion prepared by the Japan Patent Office dated Jan. 26, 2021, for International Application No. PCT/JP2020/047389, 2 pgs.

* cited by examiner

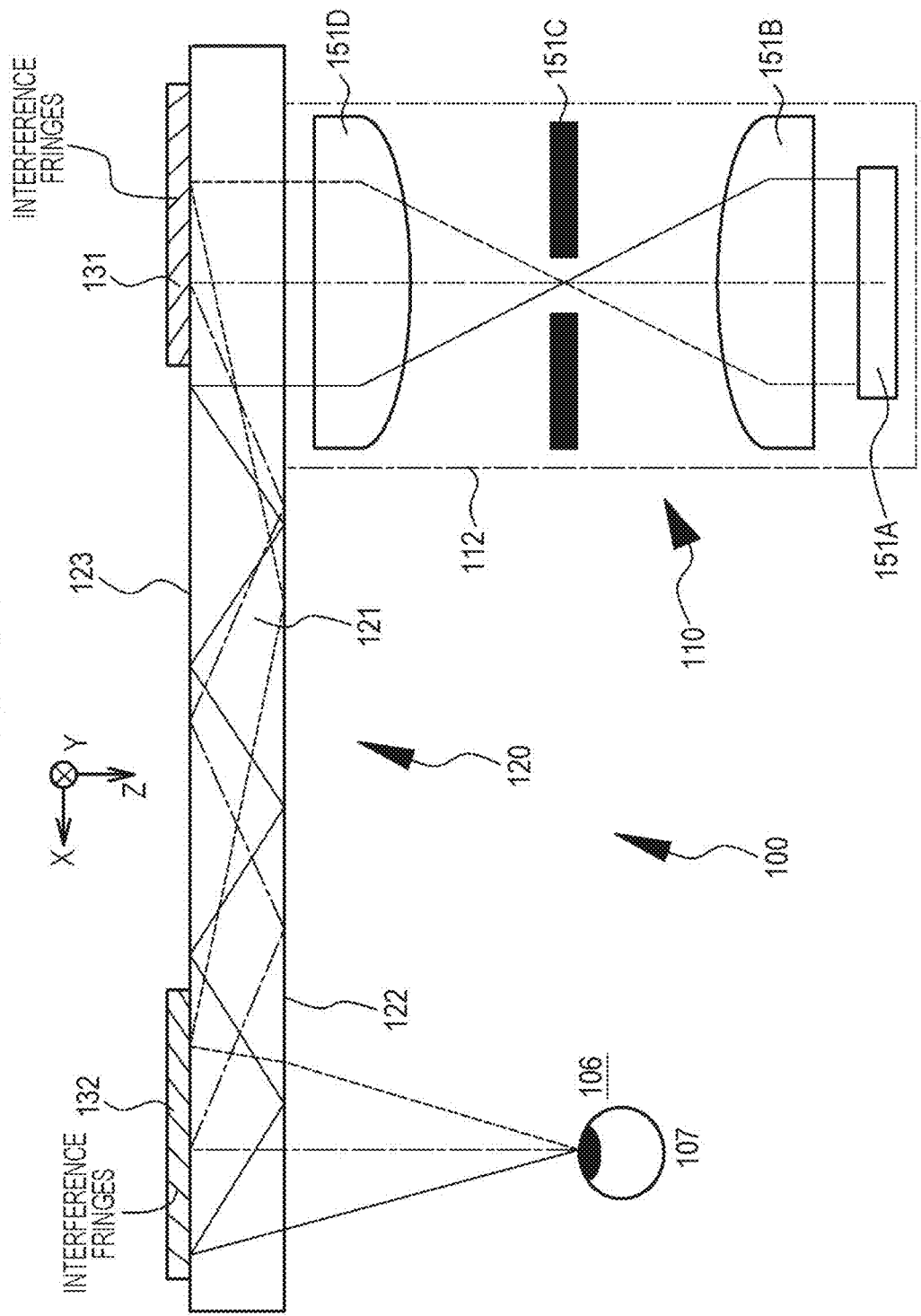

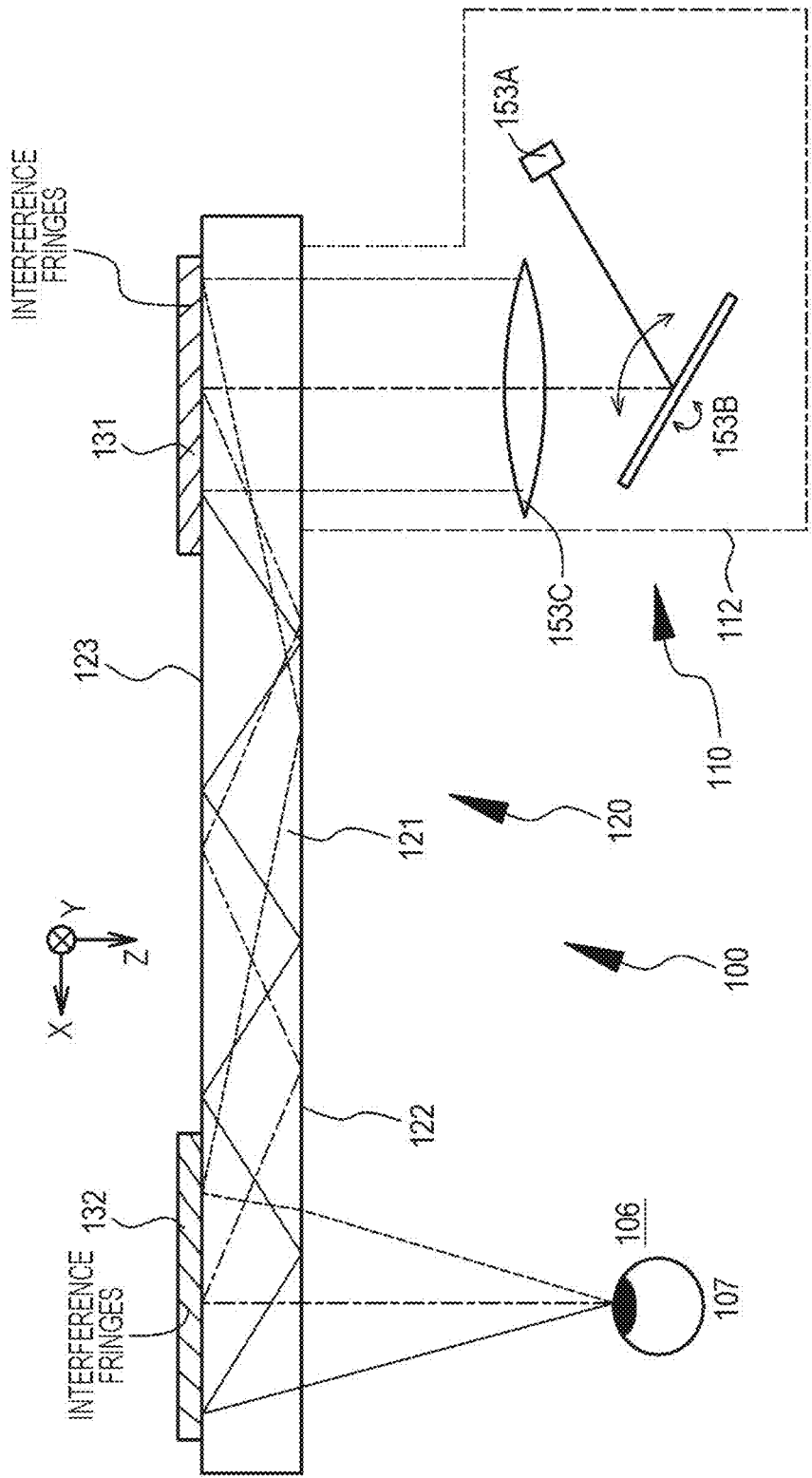

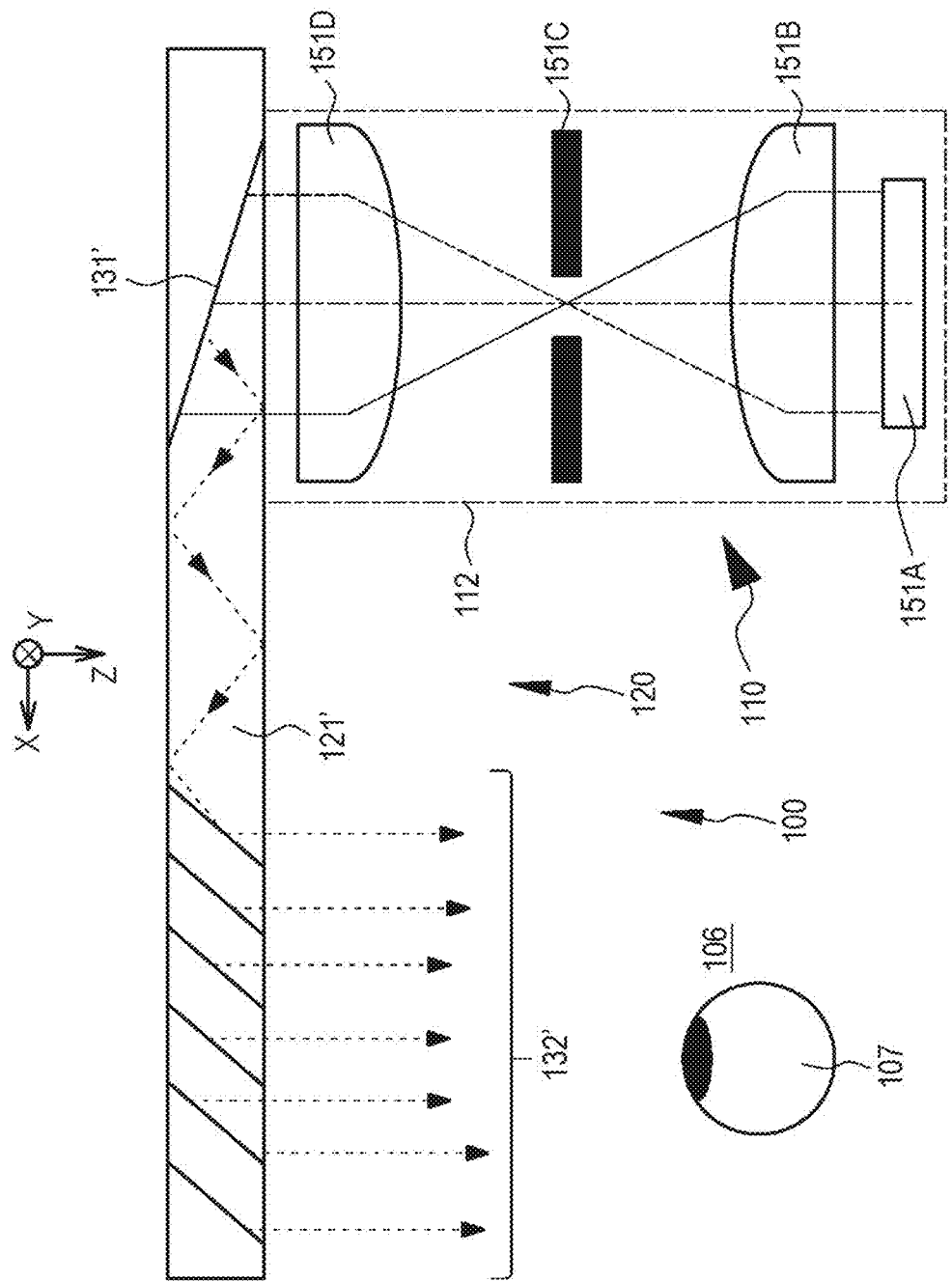

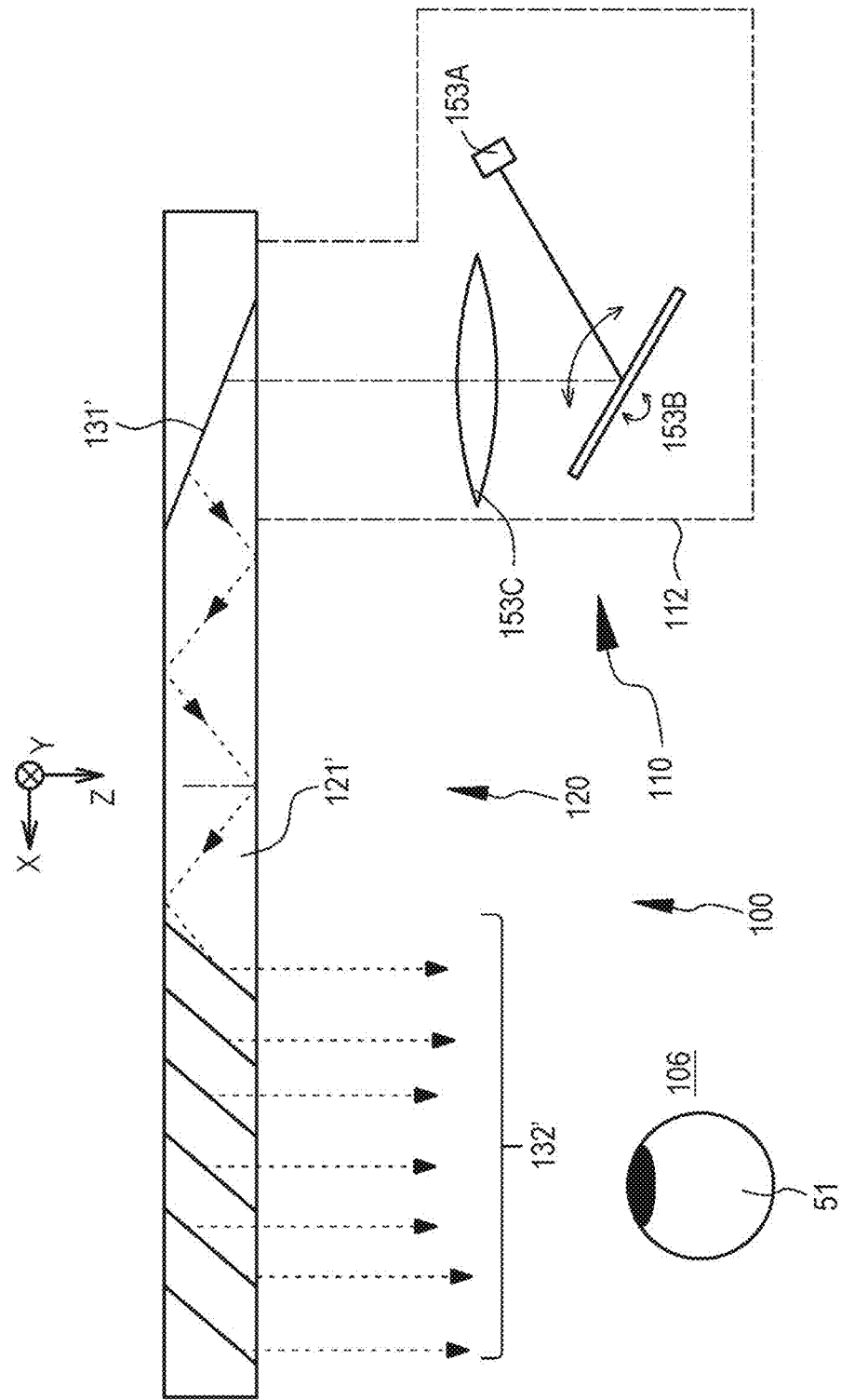

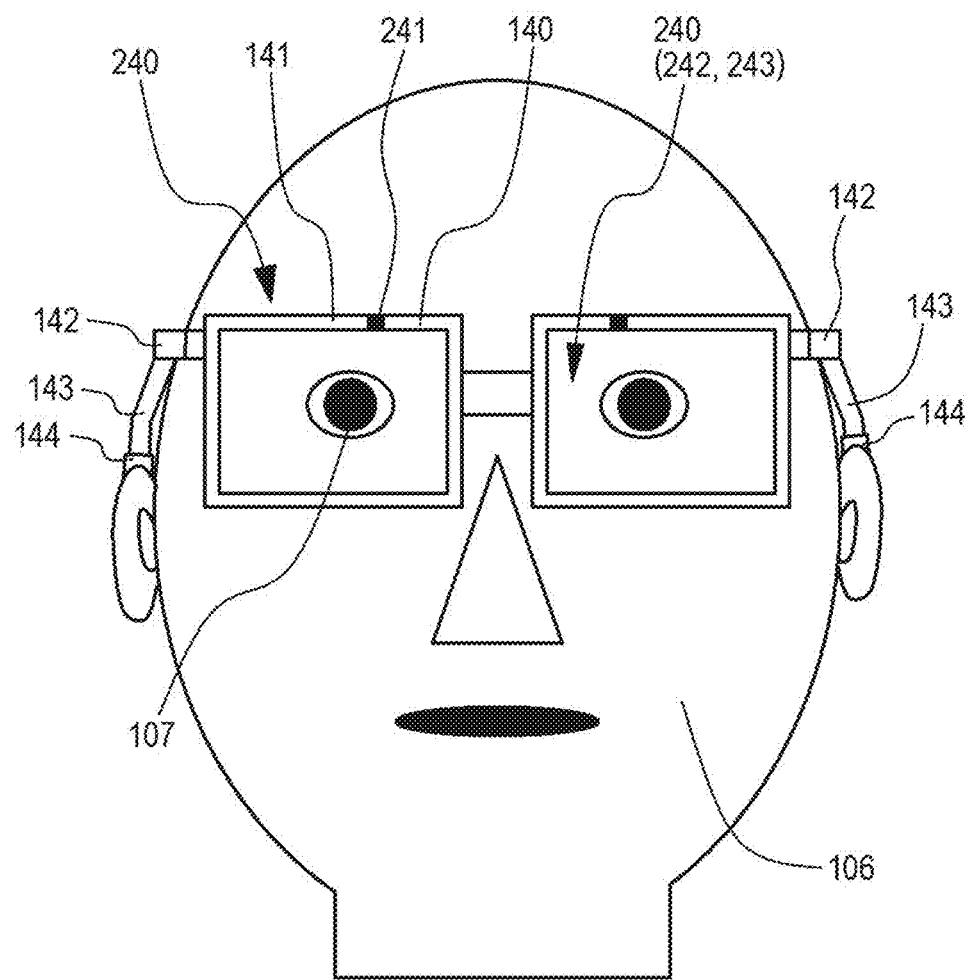

DISPLAY DEVICE

CROSS REFERENCE TO RELATED APPLICATIONS

This application is a national stage application under 35 U.S.C. 371 and claims the benefit of PCT Application No. PCT/JP2020/047389, having an international filing date of 18 Dec. 2020, which designated the United States, which PCT application claimed the benefit of Japanese Patent Application No. 2020-008161, filed 22 Jan. 2020, the entire disclosures of each of which are incorporated herein by reference.

TECHNICAL FIELD

The present disclosure relates to a display device, specifically, a display device by which an image can be observed by superimposing on a real image of an outside world in front of an observer.

BACKGROUND ART

For example, in a case where a black image (see FIG. 25A) is displayed as a virtual image on a head mounted display (HMD), gradations are zero or close to zero, and thus the image is displayed in a transparent state (see FIGS. 4A and 25B), making it difficult to recognize the black image. An image processing device that, in order to display a black image, displays this image as a virtual image in color close to opaque black as illustrated in FIG. 25C is known from Japanese Patent Application Laid-Open No. 2016-128893. An image processing device disclosed in this patent publication includes:

a determination means that determines whether each of a plurality of pixels included in image data is a transparent pixel that is a pixel to be displayed transparently or an opaque pixel that is a pixel to be displayed opaquely;

a conversion means that converts at least a pixel value of a pixel having a first pixel value closer to a black pixel value than a predetermined black threshold among opaque pixels into a second pixel value closer to a white pixel value than the first pixel value; and an output means that outputs converted image data after the conversion means converts the pixel value to a display means.

That is, in a pixel that displays black or a gradation close to black, a kind of offset signal is added to a pixel signal to display a gray gradation (see FIG. 25 C), thereby preventing the pixel from becoming a physically transparent pixel.

CITATION LIST

Patent Document

Patent Document 1: Japanese Patent Application Laid-Open No. 2016-128893

SUMMARY OF THE INVENTION

Problems to be Solved by the Invention

However, in such a process of adding a kind of offset signal to the pixel signal, it is impossible to effectively express black, and there is also a problem that image quality is deteriorated as a result of discontinuity of a signal level.

Therefore, an object of the present disclosure is to provide a display device capable of effectively representing black without causing deterioration in image quality.

Solutions to Problems

A display device according to first to third aspects of the present disclosure for achieving the above-described object includes an image display device and a control unit, in which
  the image display device includes
  an image formation device, and
  an optical device that displays an image emitted from the image formation device in front of an observer while superimposing the image on a real image of an outside world, and
  the control unit controls an operation of the image formation device.

Then, in the display device according to the first aspect of the present disclosure, in a case where a black display edge that is an edge of an area where black is displayed exists in the image, the control unit performs reversing processing and luminance increasing processing of the black display edge.

Furthermore, in the display device according to the second aspect of the present disclosure, in a case where a black display edge that is an edge of an area where black is displayed exists in the image, the control unit performs luminance increasing processing of a background image to be superimposed on a background portion including the image.

Moreover, in the display device according to the third aspect of the present disclosure, in a case where a black display edge that is an edge of an area where black is displayed exists in the image, the control unit performs luminance increasing processing of a background image to be superimposed on a background portion including the black display edge.

A display device according to a fourth aspect of the present disclosure for achieving the above-described object includes an image display device for a right eye, an image display device for a left eye, and a control unit, in which
  each of the image display devices includes
  an image formation device, and
  an optical device that displays an image emitted from the image formation device in front of an observer while superimposing the image on a real image of an outside world,
  the control unit controls operations of the image formation device for the right eye and the image formation device for the left eye,
  in a case where a black display edge that is an edge of an area where black is displayed exists in the image, the control unit performs processing of superimposing a background image on a background portion of the image in the image display device for the right eye and performs processing of superimposing a background image on a background portion of the image in the image display device for the left eye, and
  the control unit displays the background image with reference to a portion of the image displayed at a position farthest from the observer in a virtual image space.

BRIEF DESCRIPTION OF DRAWINGS

FIG. 14 is a conceptual view of an image display device constituting the head mounted display of the fifth embodiment.

FIG. 16 is a conceptual view of modification example-1 of the image display device constituting the head mounted display of the fifth embodiment.

FIG. 17 is a conceptual view of modification example-2 of the image display device constituting the head mounted display of the fifth embodiment.

FIG. 18 is a conceptual view of modification example-3 of the image display device constituting the head mounted display of the fifth embodiment.

FIG. 20 is a schematic view of a display device of the sixth embodiment as viewed from the front.

MODE FOR CARRYING OUT THE INVENTION

Figure 1A:
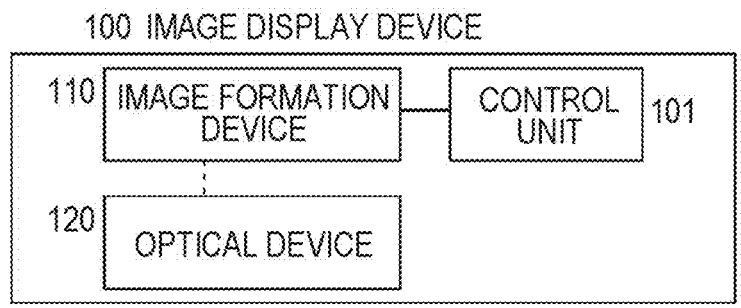
FIG. 1A is a conceptual diagram of a display device of a first embodiment.

Hereinafter, the present disclosure will be described on the basis of embodiments with reference to the drawings, but the present disclosure is not limited to the examples, and various numerical values and materials in the examples are examples. Note that the description will be made in the following order.

1. General description of display devices according to first to fifth aspects of present disclosure
2. First embodiment (display device according to first and fifth aspects of present disclosure)
3. Second embodiment (display device according to second, fourth, and fifth aspects of present disclosure)
4. Third embodiment (display device according to third and fifth aspects of present disclosure)
5. Fourth embodiment (modification of first to third embodiments)
6. Fifth embodiment (structure of display device according to first to fifth aspects of present disclosure [part 1])
7. Sixth embodiment (structure of display device according to first to fifth aspects of present disclosure [part 2])
8. Seventh embodiment (structure of display device according to first to fifth aspects of present disclosure [part 3])
9. Eighth embodiment (modification of seventh embodiment)
10. Others <General Description of Display Devices According to First to Fifth Aspects of the Present Disclosure>

A display device according to a fifth aspect of the present disclosure includes an image display device for the right eye, an image display device for the left eye, and a control unit, in which
each image display device includes
an image formation device, and an optical device that displays an image emitted from the image formation device in front of an observer while superimposing the image on a real image of an outside world, the control unit controls operations of the image formation device for the right eye and the image formation device for the left eye, and in a case where a black display edge, which is an edge of an area where black is displayed, exists in the image, the control unit (A) performs reversing processing and luminance increasing processing of the black display edge in the image display device for the right eye, and performs reversing processing and luminance increasing processing of the black display edge in the image display device for the left eye, (B) performs luminance increasing processing of a background image to be superimposed on a background portion including an image in the image display device for the right eye, and performs luminance increasing processing of a background image to be superimposed on a background portion including an image in the image display device for the left eye, or (C) performs luminance increasing processing of the background image to be superimposed on the background portion including the image in the image display device for the right eye, and performs luminance increasing processing of the background image to be superimposed on the background portion including the image in the image display device for the left eye.

Hereinafter, a display device according to a part of the first and fifth aspects of the present disclosure will be collectively referred to as a "display device or the like according to the first aspect of the present disclosure", a display device according to the rest of the second to fifth aspects of the present disclosure will be collectively referred to as a "display device or the like according to the second aspect of the present disclosure", and display devices according to the first to fifth aspects of the present disclosure will be collectively referred to as a "display device or the like of the present disclosure".

In the display device or the like of the present disclosure, the "black display edge" is defined as follows. That is, it means that, in the black display edge, a luminance value of the black display edge of the image (display object) is "0", or when the number of gradations is represented by $2^X$, the number of gradations of the black display edge is $2^{X-4}$ or less.

In the following description, values and the like of the image signal (luminance signal) are defined as follows.

$S_{A-1}$: a value of the image signal (luminance signal) of the black display edge before the luminance increasing processing of the black display edge or the luminance increasing processing of the background image is performed $S_{A-2}$: in a case where the black display edge exists in the image, a value of the image signal (luminance signal) of the black display edge or the background image after the luminance increasing processing of the black display edge or the luminance increasing processing of the background image is performed $S_{A-2}'$: a value of the image signal (luminance signal) of the black display edge or the background image after the luminance increasing processing of the black display edge or the luminance increasing processing of the background image is performed on the basis of an illuminance measurement result of the outside world $S_{A-2}''$: a value of the image signal (luminance signal) of the black display edge or the background image after the luminance increasing processing of the black display edge or the luminance increasing processing of the background image is performed on the basis of line-of-sight information of the observer $S_{B-2}$: a value of the image signal (luminance signal) of the black display edge or the background image after the luminance increasing processing of the black display edge or the luminance increasing processing of the background image is performed on the basis of information of transmittance $S_{C-2}$: a value of the image signal (luminance signal) of the black display edge or the background image after the luminance increasing processing of the black display edge or the luminance increasing processing of the background image is performed on the basis of a measurement result of spatial frequency $S_{D-1}$: an average value of the image signal (luminance signal) of the black display edge $S_{D-2}$: an average value of the image signal (luminance signal) of the background image $S_{E-1}$: an average value of the image signal (luminance signal) of a background portion including the black display edge $S_{E-2}$: an average value of image signal (luminance signal) of the background image $LX_1$: a preset value of illuminance of the outside world (one kind of reference value)

$LX_2$: a measurement value of illuminance of the outside world

In the display device or the like according to the first aspect of the present disclosure, in a case where the black display edge exists in the image, the control unit performs the reversing processing and the luminance increasing processing of the black display edge, and $S_{A-1}$ and $S_{A-2}$ preferably follow the following rules. That is, a mode can be employed in which the luminance increasing processing is such that the control unit that has received the image signal (luminance signal) [value $S_{A-1}$] of the black display edge before the luminance increasing processing of the black display edge obtains the image signal (luminance signal) [value $S_{A-2}$] on the basis of the following [first rule between $S_{A-1}$ and $S_{A-2}$] determined in advance.

[First Rule Between $S_{A-1}$ and $S_{A-2}$]

$$S_{A-2}=S_{A-1}+G_{A-2}$$

Here, $G_{A-2}$ is an arbitrary value of four gradations or more and 16 gradations or less in 256 gradations (8 bits). Alternatively, broadly, when the number of gradations is represented by $2^X$, $G_{A-2}$ is set to an arbitrary value of the number of gradations of $2^{X-6}$ or more and $2^{X-4}$ or less.

Note that a mode can be employed in which an image signal of the entire image including the image signal (luminance signal) [value $S_{A-1}$] of the black display edge before the luminance increasing processing of the black display edge or the background image, or information or data (hereinafter, these may be collectively referred to as "data and the like") regarding the image, is received from the outside. In such a mode, data and the like are recorded, stored, and saved in, for example, what is called a cloud computer or a server, and by the display device via a communication means (for example, a telephone line, an optical line, a mobile phone, or a smartphone) or by combining the display device and the communication means, the data and the like can be exchanged or obtained between the cloud computer or the server and the display device. Then, the control unit performs processing according to various rules (first to seventh rules). Alternatively, data and the like may be recorded, stored, and saved in the display device. In some cases, the value $S_{A-2}$, the value $S_{A-2}'$, the value $S_{A-2}''$, the value $S_{B-2}$, the value $S_{C-2}$, the value $S_{D-2}$, and the value $S_{E-2}$ are obtained in advance on the basis of the value $S_{A-1}$, the value $S_{D-1}$, and the value $S_{E-1}$, and the value $S_{A-2}$, the value $S_{A-2}'$, the value $S_{A-2}''$, the value $S_{B-2}$, the value $S_{C-2}$, the value $S_{D-2}$, and the value $S_{E-2}$ may be recorded, stored, and saved in the cloud computer or the server, or may be recorded, stored, and saved in the display device.

The display device or the like of the present disclosure including the above-described preferred embodiment further includes an illuminance measurement device that measures illuminance of the outside world; a mode can be employed in which, on the basis of an illuminance measurement result of the illuminance measurement device, the control unit performs the luminance increasing processing of the black display edge (display device or the like according to the first aspect of the present disclosure), or the control unit performs the luminance increasing processing of the background image (display device or the like according to the second aspect of the present disclosure). Specifically, the illuminance measurement device can include an illuminance sensor, and the illuminance can be obtained by an imaging device (or a camera).

Here, in the luminance increasing processing of the black display edge or the luminance increasing processing of the background image, in a case where $LX_2 \geq LX_1$, $S_{A-1}$ and $S_{A-2}'$ preferably follow the following rule. That is, a mode can be employed in which the luminance increasing processing of the black display edge or the luminance increasing processing of the background image is such that the control unit that has received the image signal (luminance signal) [value $S_{A-1}$] of the black display edge before the luminance increasing processing of the black display edge or the luminance increasing processing of the background image obtains the image signal (luminance signal) [value $S_{A-2}'$] on the basis of the following [second rule between $S_{A-1}$ and $S_{A-2}'$] determined in advance.

[Second Rule Between $S_{A-1}$ and $S_{A-2}{}^1$]
In a case where $LX_2 \geq LX_1$, it is expressed by:

$$S_{A-2}' = S_{A-2} + \{(\rho/\pi) \times (LX_2 - LX_1)\}$$

Here, $\rho$ is reflectance of the background image.
In a case where $LX_2 < LX_1$:
$S_{A-2} = S_{A-2}$ In the display device or the like according to the first aspect of the present disclosure including the preferable modes described above, a mode can be employed in which the control unit obtains an image of the black display edge obtained by performing reversing processing and performing resolution reduction on the image, and thereafter performs combining processing of the image of the black display edge obtained by performing the luminance increasing processing on the image of the black display edge and an original image, or a mode can be employed in which the control unit obtains an image of the black display edge obtained by performing reversing processing and performing resolution reduction on the image, thereafter performs blurring processing, and performs combining processing of the image of the black display edge obtained by performing the luminance increasing processing on the image of the black display edge and an original image. Here, either the reversing processing of the image or resolution reduction processing (for example, binarization processing, weighting processing on binarization processing and binarization, and gray scale processing) may be performed first. As the processing for obtaining the image of the black display edge on which the resolution reduction has been performed, specifically, known edge processing can be mentioned. Known Gaussian filtering processing or known median filtering processing may be performed on the image of the black display edge on which the reversing processing and the resolution reduction have been performed.

Moreover, the display device or the like according to the first aspect of the present disclosure including the preferable mode described above further includes a line-of-sight information acquisition unit that acquires the line-of-sight information of the observer; a mode can be employed in which the control unit performs the luminance increasing processing of the black display edge included in a gaze point of the observer and the vicinity thereof, and the display device or the like according to the second aspect of the present disclosure including the preferable mode described above further includes a line-of-sight information acquisition unit that acquires the line-of-sight information of the observer; a mode can be employed in which the control unit performs the luminance increasing processing of the background image included in the gaze point of the observer and the vicinity thereof. As the line-of-sight information acquisition unit, a known eye tracking device (eye tracking camera) can be mentioned. In the eye tracking device, a reflection point of light (for example, near infrared rays) is generated on the cornea, an image thereof is captured by the eye tracking device, the reflection point of light on the cornea and the pupil are identified from the captured image of the eyeball, and the direction of the eyeball is calculated on the basis of the reflection point of the light and other geometric features.

Here, it is preferable that $S_{A-1}$ and $S_{A-2}''$ follow the following rules. That is, a mode can be employed in which the luminance increasing processing of the black display edge or the luminance increasing processing of the background image is such that the control unit that has received the image signal (luminance signal) [value $S_{A-1}$] of the black display edge before the luminance increasing processing of the black display edge or the background image obtains the image signal (luminance signal) [value $S_{A-2}''$] on the basis of the following [third rule between $S_{A-1}$ and $S_{A-2}''$] determined in advance.

[Third Rule Between $S_{A-1}$ and $S_{A-2}''$] $S_{A-2}'' = S_{A-1} + G_{A-2}''$
Here, $G_{A-2}''$ has an arbitrary value of four gradations or more and 16 gradations or less in 256 gradations (8 bits). Alternatively, broadly, when the number of gradations is represented by $2^X$, $G_{A-2}''$ is an arbitrary value of the number of gradations of $2^{X-6}$ or more and $2^{X-4}$ or less.

Moreover, in the display device or the like according to the first aspect of the present disclosure including the preferable mode described above, the information of the image includes information (alpha channel) of transmittance; a mode can be employed in which the control unit performs the luminance increasing processing of the black display edge on the basis of the information of transmittance, and in the display device or the like according to the second aspect of the present disclosure including the preferable mode described above, the information of the image includes the information (alpha channel) of transmittance; a mode can be employed in which the control unit performs the luminance increasing processing of the background image on the basis of the information of transmittance. Specifically, as the transmittance is higher, the luminance of the black display edge after the reversing processing is only required to be increased, or the luminance of the background image is only required to be increased.

Here, $S_{A-1}$ and $S_{B-2}$ preferably follow the following rules. That is, a mode can be employed in which the luminance increasing processing of the black display edge or the luminance increasing processing of the background image is such that the control unit that has received the image signal (luminance signal) [value $S_{A-1}$] of the black display edge before the luminance increasing processing of the black display edge or the background image obtains the image signal (luminance signal) [value $S_{BA-2}$] on the basis of the following [fourth rule between $S_{A-1}$ and $S_{B-2}$] determined in advance.

[Fourth Rule Between $S_{A-1}$ and $S_{B-2}$]

$$S_{B-2}=S_{A-1}+G_{B-2}\times \alpha/2^X$$

Here, $G_{B-2}$ has an arbitrary value of four gradations or more and 16 gradations or less in 256 gradations (8 bits). Alternatively, broadly, when the number of gradations is represented by $2^X$, $G_{B-2}$ is an arbitrary value of the number of gradations of $2^{X-6}$ or more and $2^{X-4}$ or less. Furthermore, a is a gradation value of an alpha channel, and in a case of full transmission, the values of $G_{B-2}$ are added together similarly to other rules.

Moreover, the display device or the like according to the first aspect of the present disclosure including the preferable mode described above further includes a spatial frequency measurement unit that obtains a spatial frequency of a real image of the outside world in a superimposed area of the image and the real image of the outside world; a mode can be employed in which the control unit performs the luminance increasing processing of the black display edge on the basis of a measurement result of the spatial frequency, and the display device or the like according to the second aspect of the present disclosure including the preferable mode described above further includes a spatial frequency measurement unit that obtains the spatial frequency of the real image of the outside world in the superimposed area of the image and the real image of the outside world; a mode can be employed in which the control unit performs the luminance increasing processing of the background image on the basis of the measurement result of the spatial frequency. As the spatial frequency measurement unit, specifically, an imaging device (or a camera) can be mentioned. That is, the spatial frequency can be calculated by performing FFT (Fourier transform) on the image acquired by the camera. Specifically, as the value of the spatial frequency is higher, the luminance of the black display edge after the reversing processing is only required to be increased, or the luminance of the background image is only required to be increased. The spatial frequency represents a characteristic of a structure having a spatial period, and represents the number of repetitions of a structure included in a space of a unit length. Alternatively, the spatial frequency is the number of lights and shades included in a space of a unit length. The spatial frequency ν and the wavelength Δ have a relationship of $\nu=\lambda^{-1}$.

Here, $S_{A-1}$ and $S_{C-2}$ preferably follow the following rules. That is, a mode can be employed in which the luminance increasing processing of the black display edge or the luminance increasing processing of the background image after the reversing processing is such that the control unit that has received the image signal (luminance signal) [value $S_{A-1}$] of the black display edge before the luminance increasing processing of the black display edge or the background image obtains the image signal (luminance signal) [value $S_{C-2}$] on the basis of the following [fifth rule between $S_{A-1}$ and $S_{C-2}$] determined in advance.

[Fifth Rule Between $S_{A-1}$ and $S_{C-2}$]

$$S_{C-2}=S_{A-1}\times K(x,y)$$

Here, $K(x, y)$ is obtained by multiplying a gain value calculated at the (x, y)th pixel by a constant (predetermined) coefficient.

In the display device according to the second aspect of the present disclosure, as the shape of the background image, a circle, an ellipse, a rounded polygon, a set of dots, and a lattice shape can be mentioned.

Then, in the display device according to the second aspect of the present disclosure, it is preferable that $S_{D-1}$ and $S_{D-2}$ follow the following rules. That is, a mode can be employed in which the luminance increasing processing of the background image is such that the control unit that has received the image signal (luminance signal) [value $S_{D-1}$] of the black display edge before the luminance increasing processing of the background image obtains the image signal (luminance signal) [value $S_{D-2}$] on the basis of the following [sixth rule between $S_{D-1}$ and $S_{D-2}$] determined in advance.

[Sixth Rule Between $S_{D-1}$ and $S_{D-2}$]

$$S_{D-2}=S_{D-1}+G_{D-2}$$

Here, $G_{D-2}$ has an arbitrary value of four gradations or more and 16 gradations or less in 256 gradations (8 bits). Alternatively, broadly, when the number of gradations is represented by $2^X$, $G_{D-2}$ is an arbitrary value of the number of gradations of $2^{X-6}$ or more and $2^{X-4}$ or less. Furthermore, as the shape of the background image, it is only required to obtain a pattern and a spatial frequency of the background image and select a pattern having a large difference, or the observer can arbitrarily select the shape. The size of the shape of the background image is only required to be appropriately determined by the observer.

Furthermore, in a display device according to a third aspect of the present disclosure including the various preferable modes described above, the information of the image includes skeleton information; a mode can be employed in which the control unit performs processing of superimposing the background image on the background portion including the black display edge on the basis of the information of the image and the skeleton information, and in this case, a mode can be employed in which the control unit performs processing of superimposing the background image on the background portion including the black display edge on the basis of the information of the image and information regarding joints (feature points in the image) in the skeleton information. Specifically, a mode can be employed in which processing of superimposing the background image on the background portion including a portion that is the black display edge and corresponds to a joint (feature point in the image) of the image is performed.

In the display device according to the third aspect of the present disclosure, as the shape of the background image, a circle, an ellipse, and a rounded polygon can be mentioned.

Then, in the display device according to the third aspect of the present disclosure, $S_{E-1}$ and $S_{E-2}$ preferably follow the following rules. That is, a mode can be employed in which the luminance increasing processing of the background image is such that the control unit that has received the image signal (luminance signal) [value $S_{E-1}$] of the black display edge before the luminance increasing processing of the background image obtains the image signal (luminance signal) [value $S_{E-2}$] on the basis of the following [seventh rule between $S_{E-1}$ and $S_{E-2}$] determined in advance.

[Seventh Rule Between $S_{E-1}$ and $S_{E-2}$]

$$S_{E-2}=S_{E-1}+G_E$$

Here, $G_E$ is an arbitrary value of four gradations or more and 16 gradations or less in 256 gradations (8 bits). Alternatively, broadly, when the number of gradations is represented by $2^X$, $G_E$ is set to an arbitrary value of the number of gradations of $2^{X-6}$ or more and $2^{X-4}$ or less. As the method of determining the shape of the background image and the method of determining the size of the shape of the background image, for example, a method of determining the shape and size in accordance with the angle of a joint portion can be mentioned. Specifically, for example, in a case where an elbow portion is bent, the shape is only required to be a shape close to a circle, and in a case where the elbow portion is straight, the shape is only required to be an elongated ellipse. The size of the background image may be changed in accordance with the size and distance of the image.

In the display device according to the fourth aspect of the present disclosure, a mode can be employed in which the background image may correspond to a union of the background image in the image display device for the right eye and the background image in the image display device for the left eye.

A mode can be employed in which the display device or the like of the present disclosure including the various preferable modes described above includes a pupil diameter measurement unit that measures a pupil diameter of the observer. As the pupil diameter measurement unit, a known eye tracking device (eye tracking camera) can be mentioned. Specifically, the distance from the eye tracking device to the pupil is calculated on the basis of the image of the eye recorded by the eye tracking device, and a pupil diameter can be obtained from a diameter of the pupil in the captured image. By obtaining the pupil diameter, optimization of control of luminance of an image, control of luminance of a black display edge, control of luminance of a background image, and the like, and optimization of incidence of an image on the pupil can be performed.

As the display device or the like of the present disclosure, for example,

[A] a head mounted display (HMD) in which the entire display device is mounted on the head of the observer,

[B] a display device in which an optical device is mounted on an observer, and an image formation device and a control unit are arranged separately from the observer,

[C] a display device in which the entire display device is arranged at a place different from the observer, and moreover, the image formation device, the control unit, and the optical device are arranged at different places, in which the observer observes an image displayed on the optical device,

[D] a head up display (HUD) provided in a cockpit or the like of a vehicle or an aircraft can be mentioned. In the head up display, a combiner having a virtual image formation area in which a virtual image is formed on the basis of a light emitted from the image formation device is arranged on a windshield of the cockpit or the like of a vehicle or an aircraft.

First Embodiment

Figure 3A:
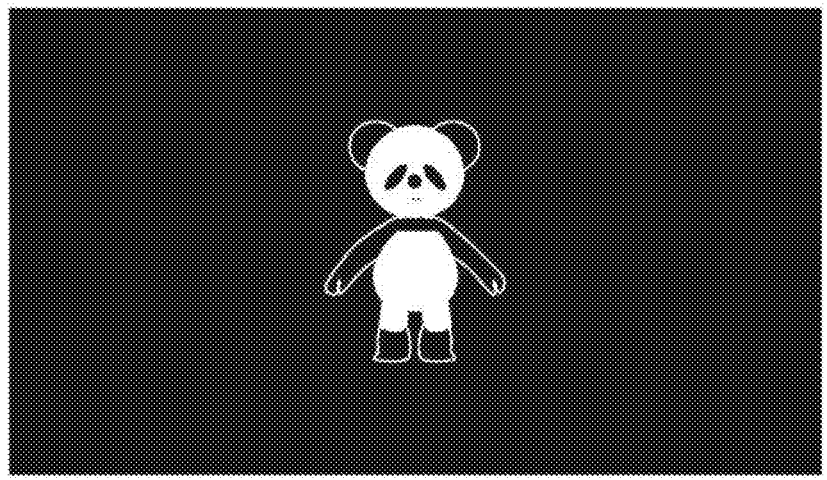
FIGS. 3A and 3B are views illustrating an image emitted from an image formation device after reversing processing and luminance increasing processing of a black display edge are performed in the display device of the first embodiment.
Figure 3B:
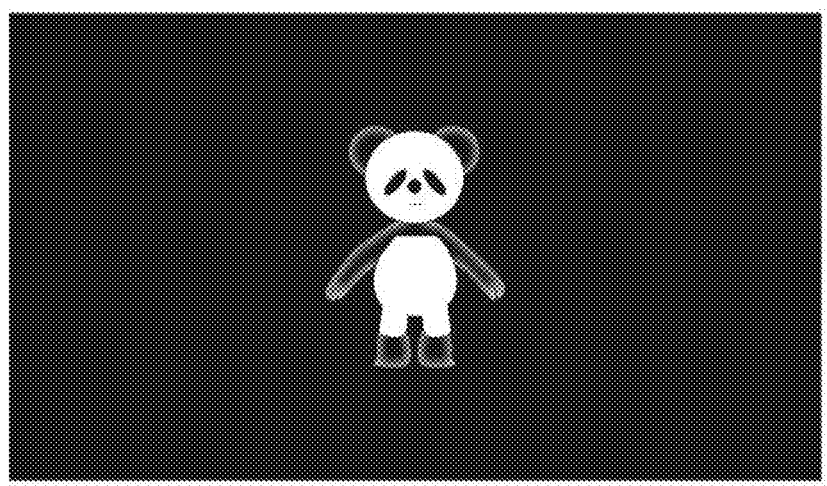
Figure 4A:
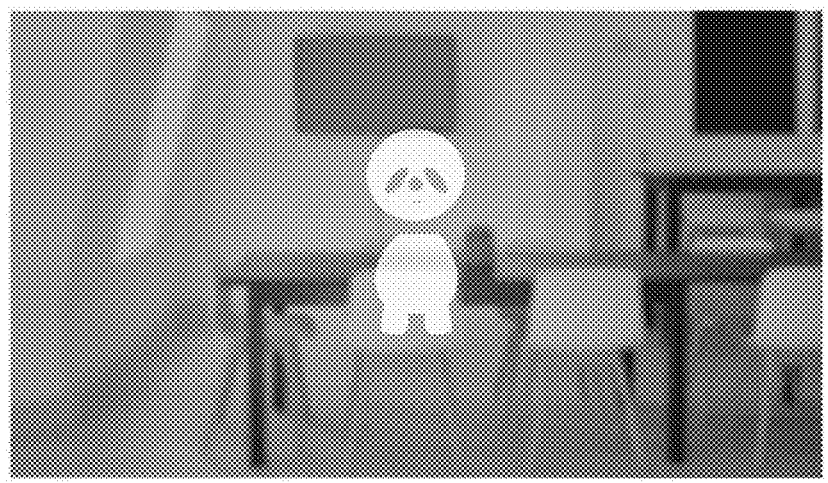
FIG. 4A is a view illustrating a state in which an image emitted from the image formation device is superimposed on a real image of an outside world in front of an observer in a conventional display device.
Figure 4B:
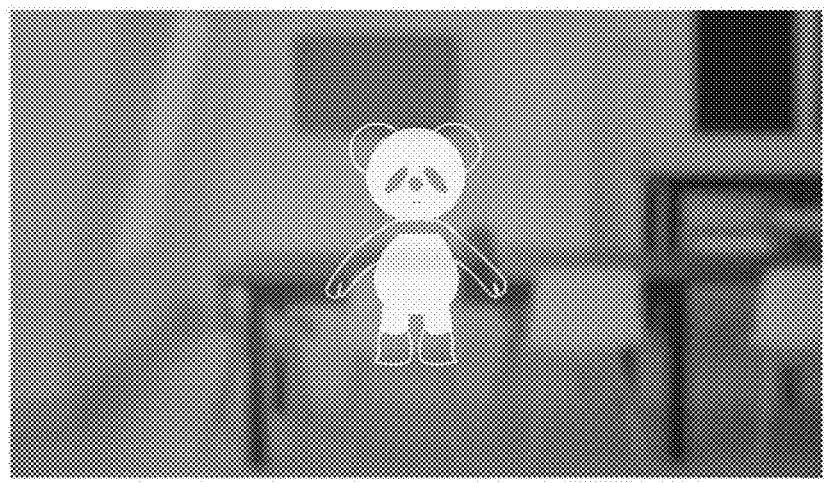
FIG. 4B is a view illustrating a state in which an image on which the reversing processing and the luminance increasing processing of the black display edge have been performed is superimposed on the real image of the outside world in front of the observer in the display device of the first embodiment.
Figure 11:
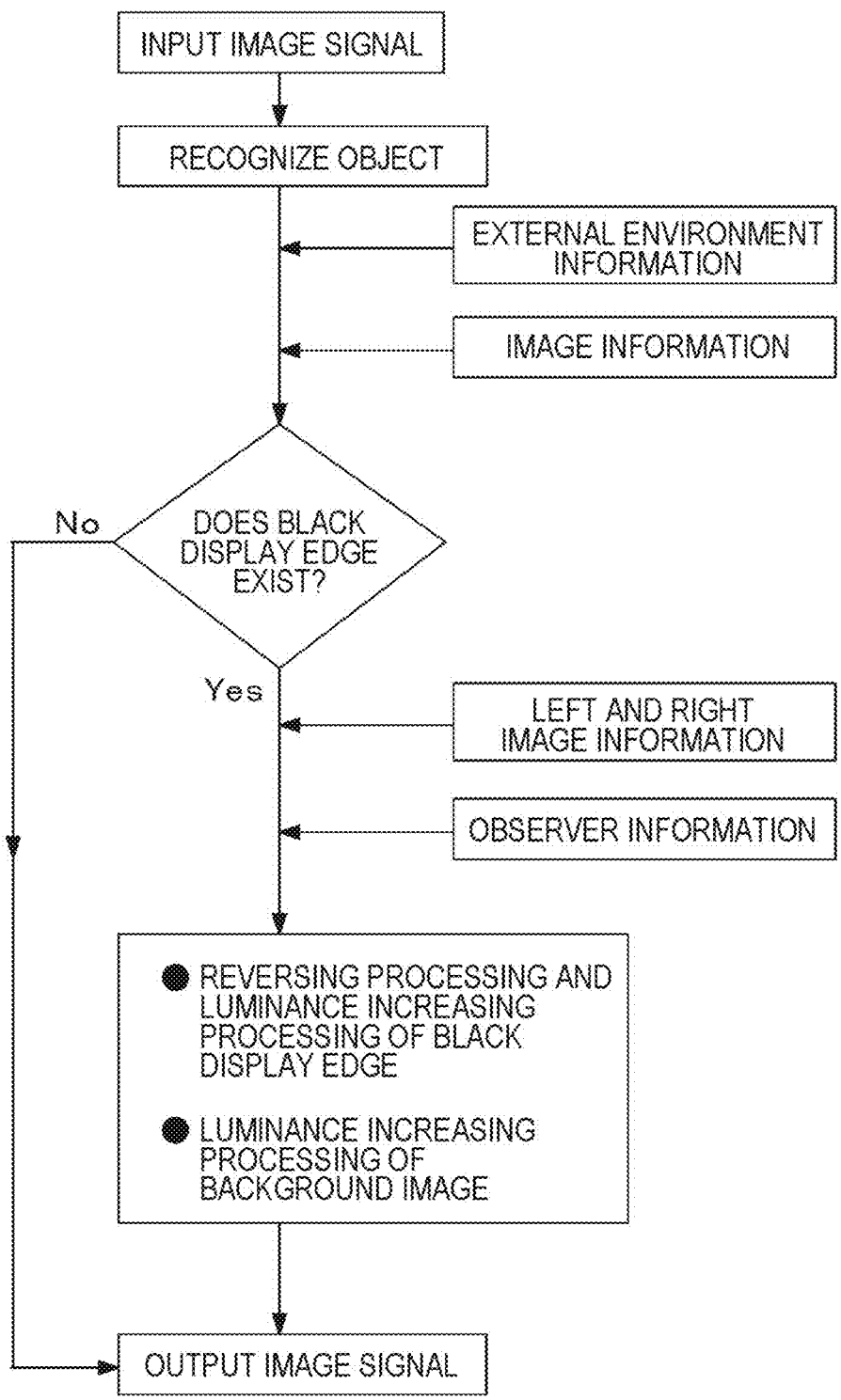
FIG. 11 is a flowchart for explaining an operation of the display device of the first to fourth embodiments.

A first embodiment relates to a display device according to a first aspect of the present disclosure and a display device according to the fifth aspect of the present disclosure. A conceptual diagram of the display device of the first embodiment is illustrated in FIG. 1A. Furthermore, in the display device of the first embodiment, an image emitted from the image formation device after the reversing processing and the luminance increasing processing of the black display edge is illustrated in FIGS. 3A and 3B. Moreover, FIG. 4A illustrates a state in which an image emitted from the image formation device is superimposed on a real image of an outside world in front of an observer in a conventional display device, and FIG. 4B illustrates a state in which an image after the reversing processing and the luminance increasing processing of the black display edge is superimposed on the real image of the outside world in front of the observer in the display device of the first embodiment. Furthermore, FIG. 11 illustrates a flowchart for explaining operations of the display devices of the first embodiment to a fourth embodiment.

As illustrated in a conceptual diagram of FIG. 1A, the display device of the first embodiment or second to eighth embodiments as described later includes an image display device 100, 200 and a control unit 101,
    the image display device 100, 200 includes
    an image formation device 110, and
    an optical device (eyepiece optical device) 120 that displays the image emitted from the image formation device 110 in front of the observer while superimposing the image on the real image of the outside world,
    in which the control unit 101 controls operation of the image formation device 110.

Then, in the display device of the first embodiment, in a case where the black display edge, which is an edge of an area where black is displayed, exists in the image, the control unit 101 performs the reversing processing and the luminance increasing processing of the black display edge.

Furthermore, the display device of the first embodiment or the display devices of the second to eighth embodiments as described later include
    an image display device 100R for the right eye, an image display device 100L for the left eye, and a control unit 101,
    each of the image display devices 100R and 100L includes
    an image formation device 110, and
    an optical device 120 that displays an image emitted from the image formation device 110 in front of the observer while superimposing the image on the real image of the outside world,
    in which the control unit 101 controls operations of the image formation device 110R for the right eye and the image formation device 110L for the left eye.

Then, in the display device of the first embodiment, in a case where the black display edge that is the edge of the area where black is displayed exists in the image, the control unit 101 performs the reversing processing and the luminance increasing processing of the black display edge in the image display device 100R for the right eye, and performs the reversing processing and the luminance increasing processing of the black display edge in the image display device 100L for the left eye.

Here, in the display device of the first embodiment, in a case where the black display edge exists in the image, the control unit 101 performs the luminance increasing processing of the black display edge, and this processing follows the above-described [first rule between $S_{A-1}$ and $S_{A-2}$].

In the following description of the first embodiment or the second to eighth embodiments as described later, the "display device" includes a display device including the image display device 100, 200 and the control unit 101, and a display device including the image display device 100R for the right eye, the image display device 100L for the left eye, and the control unit 101.

Figure 5A:
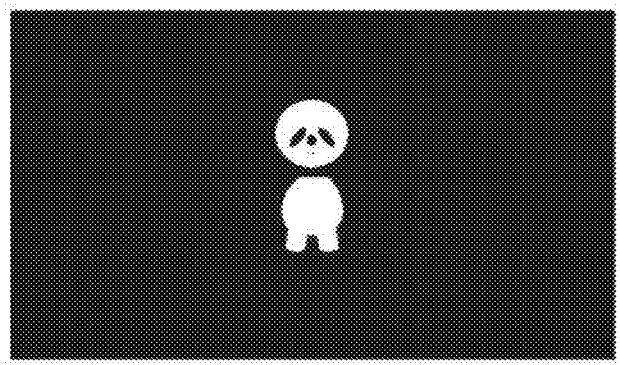
FIGS. 5A, 5B, 5C, and 5D are views of an image for explaining the reversing processing and the luminance increasing processing of a black display edge in the display device of the first embodiment.
Figure 5B:
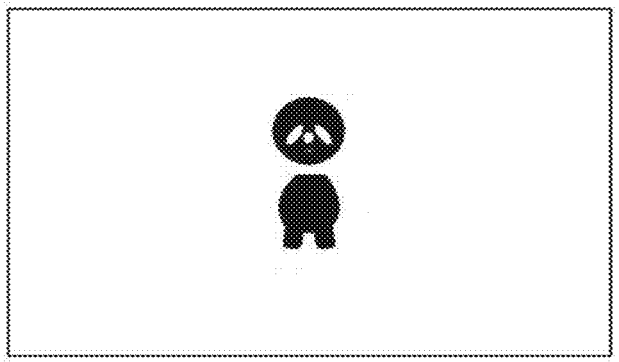
Figure 5C:
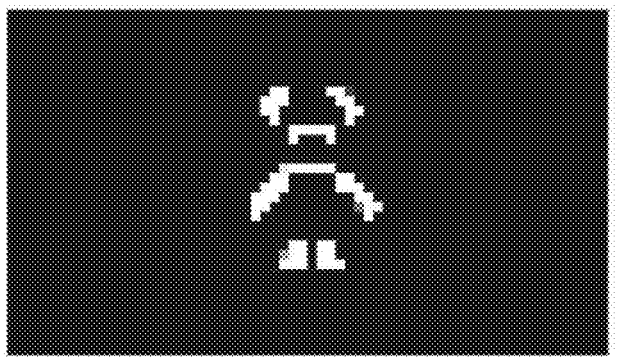
Figure 5D:
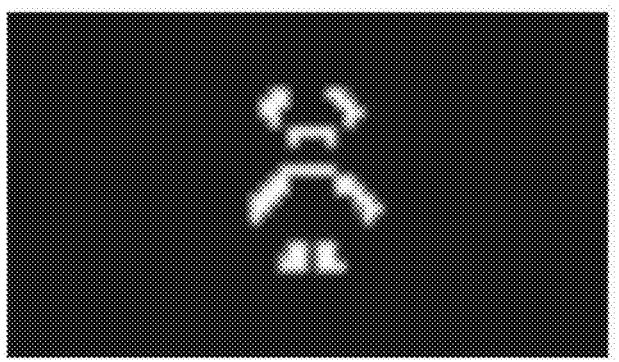
Figure 6A:
FIGS. 6A, 6B, and 6C are views of an image for explaining the reversing processing and the luminance increasing processing of the black display edge in the display device of the first embodiment.
Figure 6B:
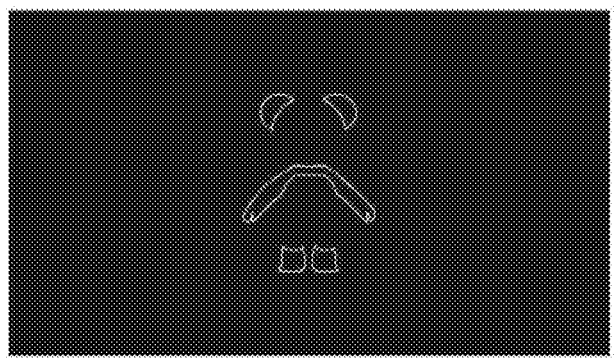
Figure 6C:
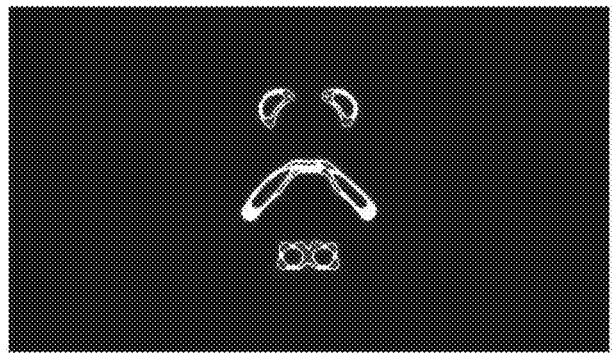

The reversing processing and the luminance increasing processing of the black display edge can be performed on the basis of the following method. That is, the control unit 101 performs the reversing processing on the image illustrated in FIG. 5A, and performs the resolution reduction processing (specifically, for example, gray scale processing) and contrast enhancement processing on the reversed image (see FIG. 5B). Next, the image of the black display edge on which the resolution reduction has been performed can be obtained on the basis of edge detection processing, for example (see FIG. 5C). Then, combining processing of the image of the black display edge obtained by performing the luminance increasing processing on the image of the black display edge and the original image is performed. FIG. 3A illustrates an image obtained by the combining processing. Luminance enhancement processing may be performed on the image of the black display edge on which the resolution reduction has been performed. This similarly applies to the following. Alternatively, the control unit 101 obtains the image of the black display edge obtained by performing the reversing processing and performing the resolution reduction on the image illustrated in FIG. 5A, for example, on the basis of the edge detection processing, thereafter performs blurring processing (see FIG. 5D), and performs the combining processing of the image of the black display edge obtained by performing the luminance increasing processing on the image of this black display edge and the original image. FIG. 3B illustrates an image obtained by the combining processing. Alternatively, the control unit 101 extracts an outline of the black display edge of the image illustrated in FIG. 6A (see FIG. 6B), and then performs luminance increasing processing on a peripheral portion of the outline of the black display edge (see FIG. 6C). Then, combining processing of the image of the black display edge obtained by performing the luminance increasing processing on the image of the black display edge and the original image is performed. Alternatively, the control unit 101 obtains the image of the black display edge obtained by performing the reversing processing and performing the resolution reduction on the image illustrated in FIG. 6A, for example, on the basis of the edge detection processing, thereafter performs the blurring processing, and performs the combining processing of the image of the black display edge obtained by performing the luminance increasing processing on the image of this black display edge and the original image. Known Gaussian filtering processing or known median filtering processing may be performed on the image of the black display edge for the blurring processing. The above various types of processing can be performed on the basis of an existing well-known algorithm. The reversing processing may include not only black-and-white reversing processing but also color reversing processing.

A flowchart for explaining the operation of the display device of the first embodiment or the second to fourth embodiments as described later is illustrated in FIG. 11, and in order to determine the presence or absence of the black display edge, the control unit 101 may consider, as necessary, external environment information such as (1) illuminance of an outside world measured by the illuminance measurement device, or (2) spatial frequency of a real image of the outside world obtained by the spatial frequency measurement unit, image information such as (3) information (alpha channel) of transmittance, may consider, for the luminance increasing processing of the black display edge or the luminance increasing processing of the background image, if necessary, observer information such as (4) line-of-sight information of the observer obtained by the line-of-sight information acquisition unit, (5) pupil diameter of the observer obtained by the pupil diameter measurement unit, and moreover, may consider left and right image information such as (6) parallax information based on information of image generated by the image display device for the right eye and information of image generated by the image display device for the left eye Moreover, FIG. 4A illustrates a state in which the image emitted from the image formation device is superimposed on the real image of the outside world in front of the observer in the conventional display device, in which when the area where black is displayed and its edge (black display edge) becomes a transparent image, and the image is displayed by superimposing on the real image of the outside world, it is difficult for the observer to recognize the image. On the other hand, in the display device of the first embodiment, since the reversing processing and the luminance increasing processing of the black display edge have been performed as a state in which an image on which the reversing processing and the luminance increasing processing of the black display edge have been performed is superimposed on the real image of the outside world in front of the observer is illustrated in FIG. 4B, the area where black is displayed and the edge (black display edge) thereof can be easily identified by the observer. That is, the portion of the black image adjacent to the black display edge on which the reversing processing and the luminance increasing processing have been performed is recognized to be relatively blacker than the black display edge, and thus the portion can be easily identified as the portion of the black image by the observer.

As described above, in the display device of the first embodiment, by performing the above processing, it is possible to effectively express black without causing deterioration in image quality, it is possible for the observer to easily recognize the black display edge or the area where black is displayed, and moreover, a display device with high image quality in which discontinuity in signal level does not occur can be provided.

Second Embodiment

A second embodiment relates to the display devices according to the second aspect, the fourth aspect, and the fifth aspect of the present disclosure. In the display device of the second embodiment, in a case where the black display edge, which is an edge of an area where black is displayed, exists in an image, the control unit 101 performs the luminance increasing processing of the background image to be superimposed on the background portion including the image.

Alternatively, in the display device of the second embodiment, in a case where the black display edge, which is the edge of the area where black is displayed, exists in the image, the control unit 101 performs processing of superimposing the background image on the background portion of the image in the image display device 100R for the right eye and performs processing of superimposing the background image on the background portion of the image in the image display device 100L for the left eye, and the control unit 101 displays the background image with reference to a portion of the image displayed at a farthest position from the observer in the virtual image space.

Furthermore, in the display device of the second embodiment, in a case where the black display edge, which is the edge of the area where black is displayed, exists in the image, the control unit 101 performs the luminance increasing processing of the background image to be superimposed on the background portion including the image in the image display device 100R for the right eye, and performs the luminance increasing processing of the background image to be superimposed on the background portion including the image in the image display device 100L for the left eye.

Figure 4C:
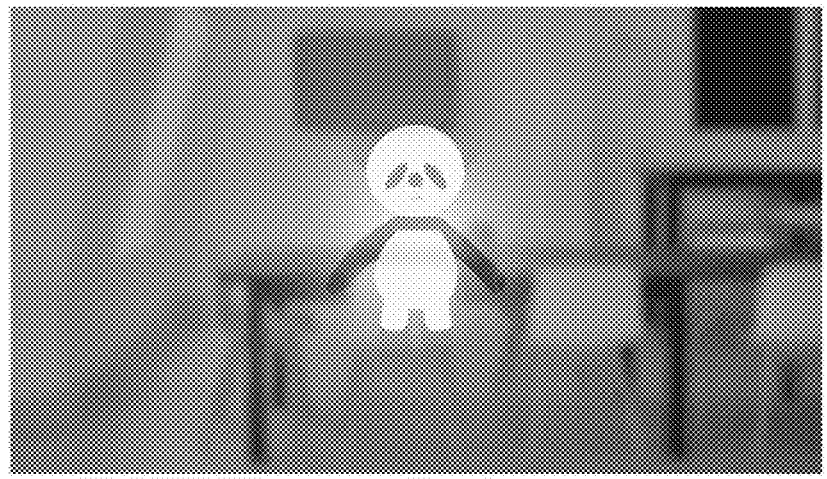
FIG. 4C is a view illustrating a state in which an image on which the luminance increasing processing of a background image to be superimposed on a background portion including the image has been performed is superimposed on the real image of the outside world in front of the observer in the display device of a second embodiment.
Figure 7A:
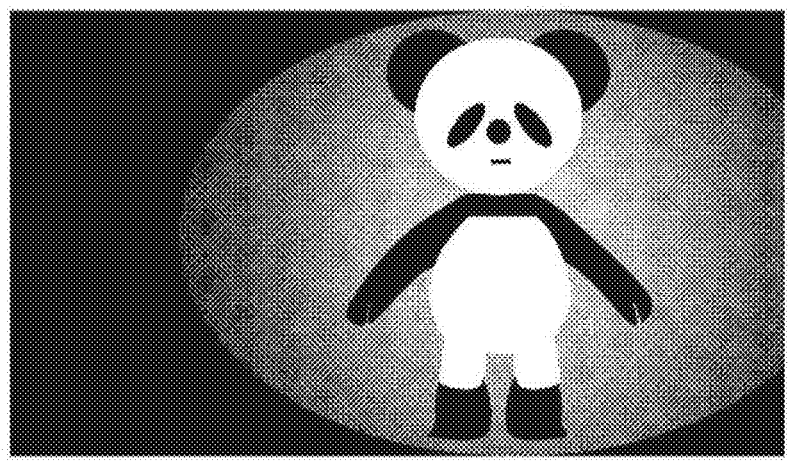
FIG. 7A is a view illustrating an image and a background image in an image display device for a left eye in a display device of the second embodiment.
Figure 7B:
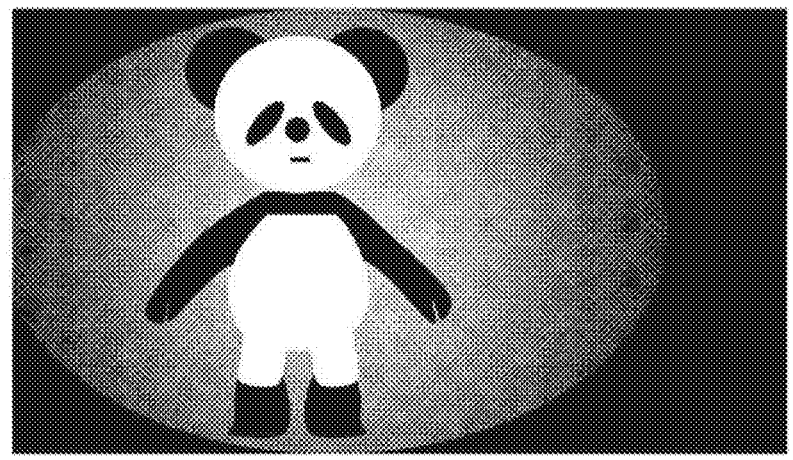
FIG. 7B is a view illustrating an image and a background image in an image display device for a right eye.

FIG. 4C illustrates a state in which an image on which the luminance increasing processing of the background image to be superimposed on the background portion including the image has been performed is superimposed on the real image of the outside world in front of the observer in the display device of the second embodiment. Furthermore, the image and the background image in the image display device 100R for the right eye are illustrated in FIG. 7A, the image and the background image in the image display device 100L for the left eye are illustrated in FIG. 7B, and an image and the background image in the image display device 100L for the left eye and the image display device 100R for the right eye are illustrated in FIGS. 9A and 9B. Note that the background images emitted from the image display device 100R for the right eye and the image display device 100L for the left eye are background images corresponding to a union of the background image illustrated in FIG. 7A and the background image illustrated in FIG. 7B. Furthermore, in FIGS. 7A, 7B, and 8A, the background image is rough due to the processing in the drawing of the background image.

Figure 8A:
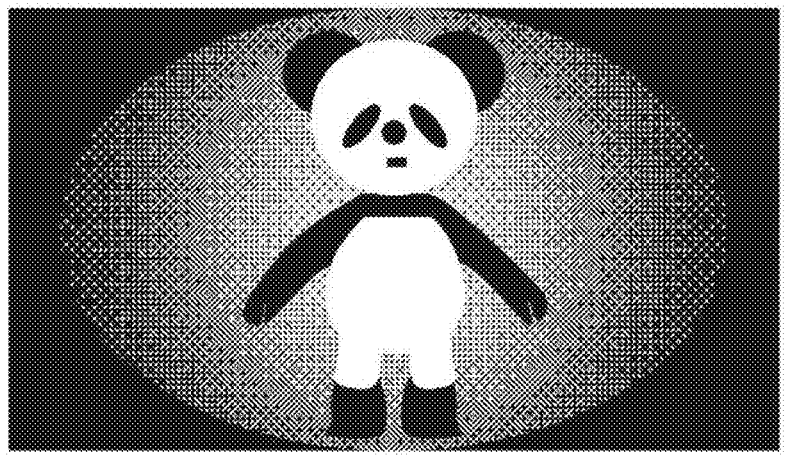
FIGS. 8A, 8B, and 8C are views illustrating an example of a background image in a display device of the second embodiment.
Figure 8B:
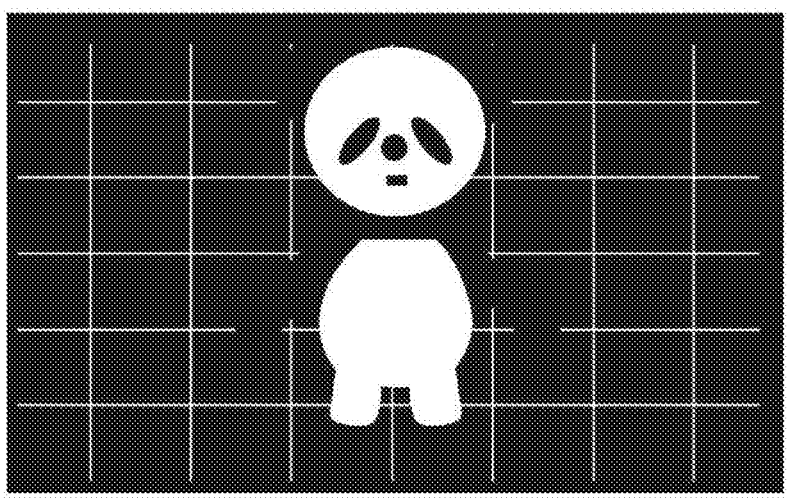
Figure 8C:
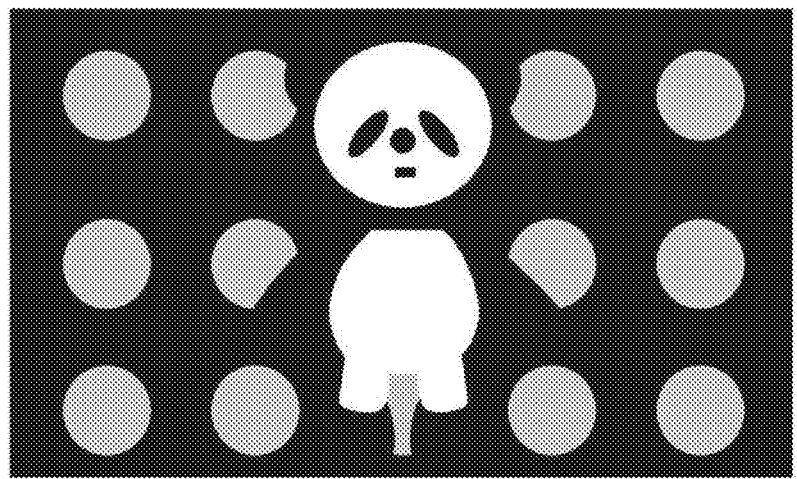
Figure 9A:
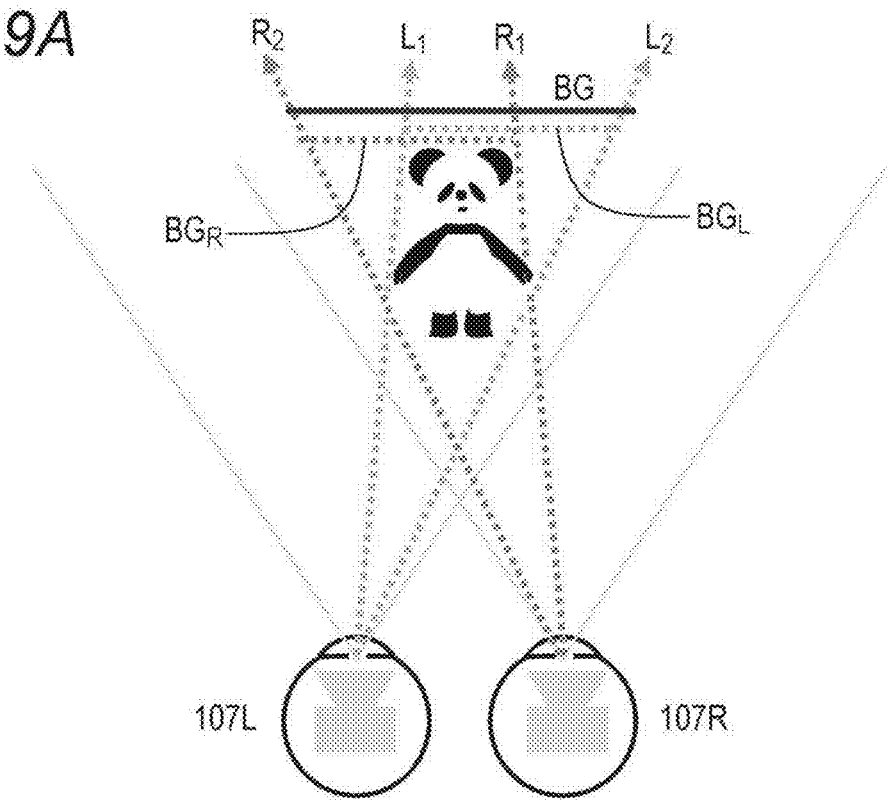
FIGS. 9A and 9B are views illustrating an image and a background image by the image display device for the left eye and the image display device for the right eye in the display device of the second embodiment.
Figure 9B:
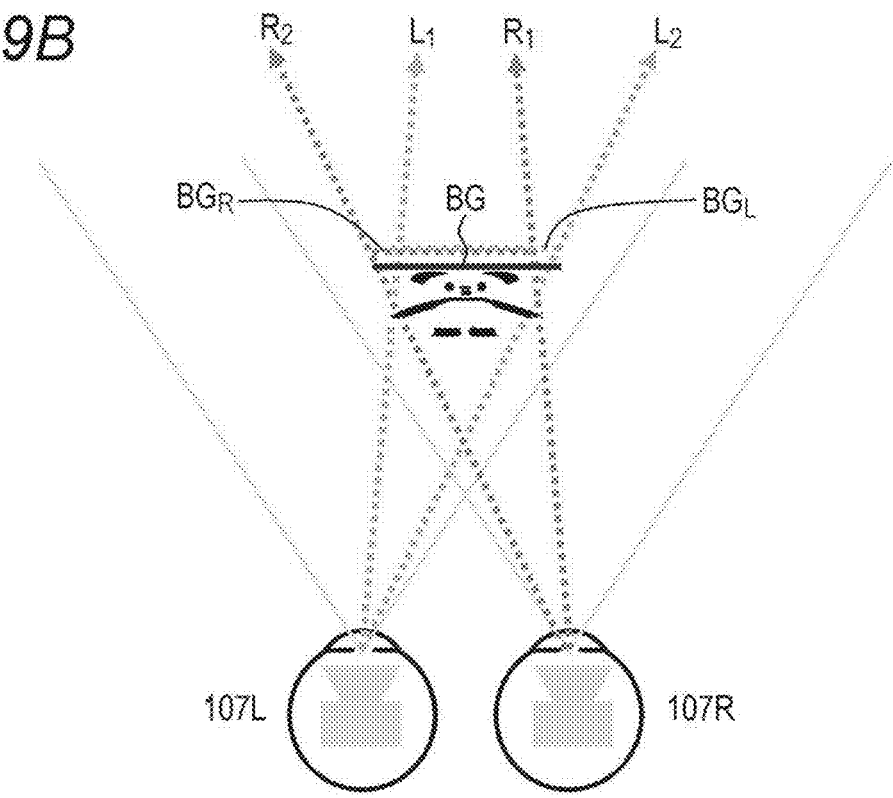

The shape of the background image may be an ellipse as illustrated in FIGS. 7A, 7B, and 8A, a lattice shape as illustrated in FIG. 8B, a set of dots as illustrated in FIG. 8C, or a circular shape or a rounded polygonal shape that is not illustrated. The background image may be gradated such that luminance decreases toward the outside of the entire image.

What kind of background image is selected can be determined, for example, by an observer operating the display device, or a background image that does not conflict with the background portion can be automatically determined. Furthermore, a pattern of the background image or the like may be changed in accordance with brightness of the background portion.

FIG. 9A illustrates an image seen in the horizontal direction from the right eye 107R and the left eye 107L of the observer. Furthermore, FIG. 9B illustrates an image seen in the vertical direction from the right eye 107R and the left eye 107L of the observer. Note that FIG. 9B is a view seen from above as a whole. In FIGS. 9A and 9B, reference numeral "$R_1$" indicates a light ray corresponding to a right end of the image and a background image viewed with the right eye 107R of the observer, reference numeral "$R_2$" indicates a light ray corresponding to a left end of the image and the background image viewed with the right eye 107R of the observer, reference numeral "$L_1$" indicates a light ray corresponding to a left end of the image and a background image viewed with the left eye 107L of the observer, and reference numeral "$L_2$" indicates a light ray corresponding to a right end of the image and the background image viewed with the left eye 107L of the observer. Furthermore, a reference numeral "$BG_R$" indicates a background image viewed with the right eye 107R of the observer, a reference numeral "$BG_L$" indicates a background image viewed with the left eye 107L of the observer, and a reference numeral "BG" indicates a background image viewed with both eyes of the observer.

The background image BG corresponds to a union of the background image $BG_R$ in the image display device 100R for the right eye and the background image $BG_L$ in the image display device 100L for the left eye. Furthermore, the background image BG is displayed with reference to a portion of the image displayed at a position farthest from the observer in the virtual image space. Specifically, in the illustrated example, the background image BG is displayed so as to be in contact with a portion corresponding to the back of a panda image. Processing of such a background image BG is only required to be processing in which the control unit 101 determines the position where the background image is to be displayed in the virtual image space from parallax information based on information of the image to be viewed by the right eye 107R of the observer (that is, information of the image generated by the image display device 100R for the right eye) and information of the image to be viewed by the left eye 107L of the observer (that is, information of the image generated by the image display device 100L for the left eye).

Then, in the display device of the second embodiment, the luminance increasing processing of the background image follows the above-described [sixth rule between $S_{D-1}$ and $S_{D-2}$].

In the display device of the second embodiment, by performing the above processing, as is clear from FIG. 4C, it is possible to effectively express black without causing deterioration in image quality, it is possible for the observer to easily recognize the black display edge or the area where black is displayed, and moreover, a display device with high image quality in which discontinuity in signal level does not occur can be provided. That is, since the portion of the black image adjacent to the background image subjected to the luminance increasing processing is recognized to be relatively blacker than the background image, the portion can be easily identified as the portion of the black image by the observer. Note that the display device of the first embodiment and the display device of the second embodiment may be combined.

Third Embodiment

A third embodiment relates to the display devices according to the third aspect and the fifth aspect of the present disclosure. In the display device of the third embodiment, in a case where the black display edge, which is an edge of an area where black is displayed, exists in an image, the control unit 101 performs the luminance increasing processing of a background image to be superimposed on a background portion including the black display edge.

Furthermore, in the display device of the third embodiment, in a case where the black display edge, which is the edge of the area where black is displayed, exists in an image, the control unit 101 performs the luminance increasing processing of the background image to be superimposed on the background portion including the image in the image display device 100R for the right eye, and performs the luminance increasing processing of the background image to be superimposed on the background portion including the image in the image display device 100L for the left eye.

Furthermore, in the display device of the third embodiment, the information of the image includes skeleton information, and the control unit 101 performs processing of superimposing the background image on the background portion including the black display edge on the basis of the information of the image and the skeleton information.

Specifically, the control unit 101 performs processing of superimposing the background image on the background portion including the black display edge on the basis of the information of the image and the information regarding joints (feature points in the image) in the skeleton information. More specifically, processing of superimposing the background image on the background portion including a portion that is the black display edge and corresponds to a joint (feature point in the image) of the image is performed. When the processing of superimposing the background image on the background portion including the portion corresponding to the joint (feature point in the image) of the image is performed, the brain of the observer complements the black image in the area (referred to as a "connection area" for convenience) between the portion corresponding to the joint of the image and the portion corresponding to the joint of the image, and the black image in the connection area can be identified. That is, the observer can reliably identify the black image in the connection area as a subjective contour.

Figure 10:
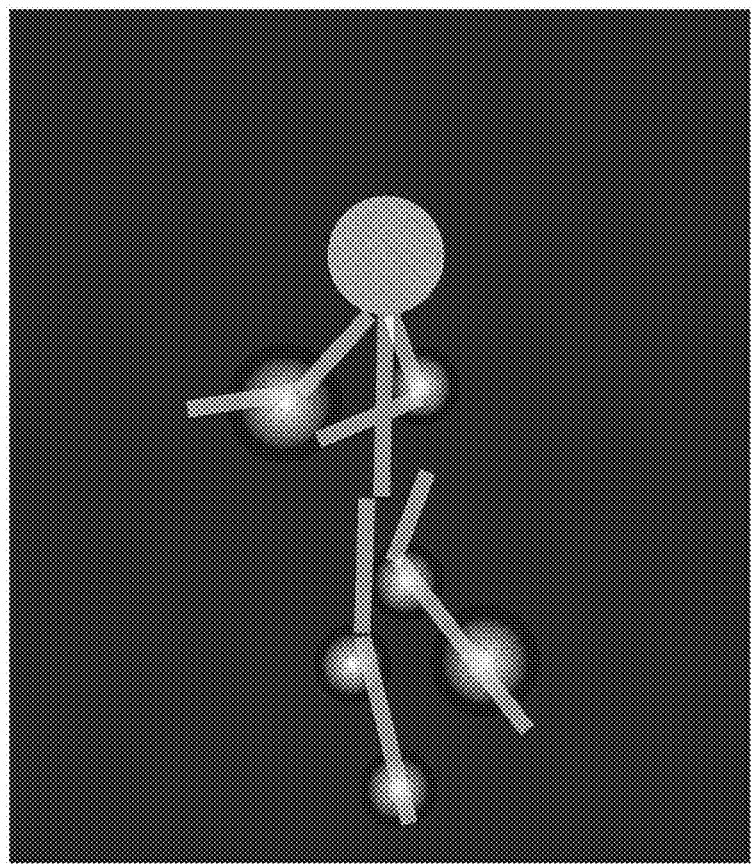
FIG. 10 is a view illustrating an example of performing processing of superimposing a background image on a background portion including the black display edge on the basis of information of an image and information regarding joints in skeleton information in the display device of a third embodiment.

FIG. 10 illustrates an example of performing processing of superimposing the background image on the background portion including the black display edge on the basis of the information of the image and the information regarding joints in the skeleton information in the display device of the third embodiment.

In the display device of the third embodiment, as the shape of the background image, a circle, an ellipse, a rounded polygon, or the like can be mentioned. Then, in the display device of the third embodiment, the luminance increasing processing of the background image follows the above-described [seventh rule between $S_{E-1}$ and $S_{E-2}$].

In the display device of the third embodiment, by performing the above processing, it is possible to effectively express black without causing deterioration in image quality, it is possible for the observer to easily recognize a portion of the black display edge or the area where black is displayed [for example, the black image of a connection area that is an area between the portion corresponding to the joint of the image (feature point in the image) and the portion corresponding to the joint of the image (feature point in the image)], and moreover, a display device with high image quality in which discontinuity in signal level does not occur can be provided. That is, since the portion of the black image adjacent to the background image subjected to the luminance increasing processing (the portion of the connection area) is recognized to be relatively blacker than the background image, the portion can be easily identified as the portion of the black image by the observer. Note that the display device of the first embodiment and the display device of the third embodiment may be combined.

Fourth Embodiment

A fourth embodiment is a modification of the first to third embodiments, particularly a modification of the display device.

Figure 1B:
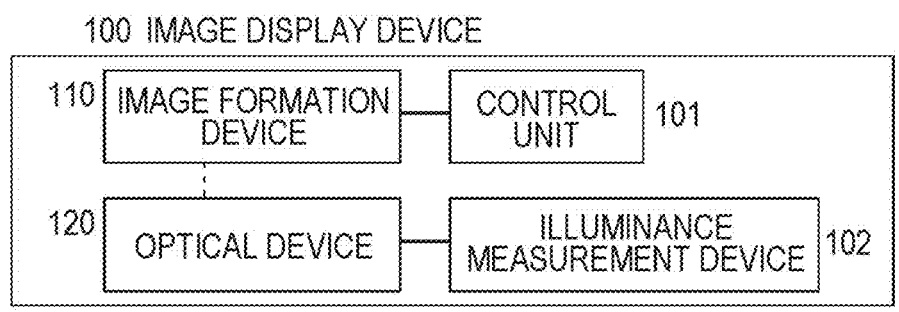
FIGS. 1B and 1C are conceptual diagrams of a display device of a fourth embodiment.

As illustrated in a conceptual diagram in FIG. 1B, the display device of the fourth embodiment may further include an illuminance measurement device 102 that measures illuminance of the outside world. Then, on the basis of an illuminance measurement result of the illuminance measurement device 102, the control unit 101 performs the luminance increasing processing of the black display edge or the luminance increasing processing of the background image. Specifically, the illuminance measurement device 102 can include an illuminance sensor, and the illuminance can be obtained by an imaging device (or a camera). Here, in the display device of the fourth embodiment, in a case where the black display edge exists in the image, the control unit 101 performs the luminance increasing processing of the black display edge or the luminance increasing processing of the background image, and this processing follows the above-described [second rule between $S_{A-1}$ and $S_{A-2}$'].

Figure 1C:
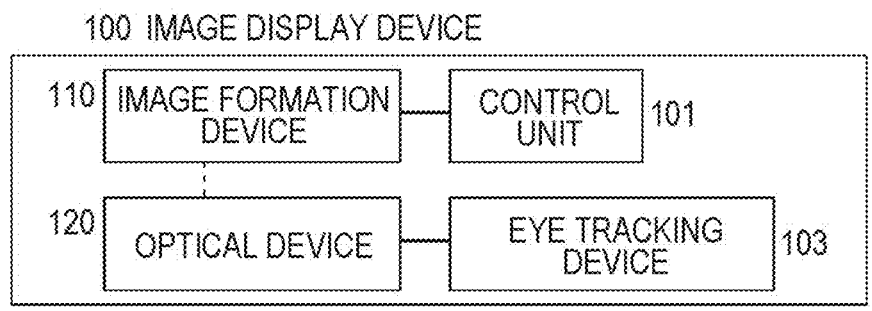

As illustrated in a conceptual diagram in FIG. 1C, a display device of a modification example-1 of the fourth embodiment further includes a line-of-sight information acquisition unit [specifically, an eye tracking device (eye tracking camera)] 103 that acquires line-of-sight information of the observer, and the control unit 101 performs the luminance increasing processing of the black display edge included in a gaze point of the observer and the vicinity thereof or the luminance increasing processing of the background image. Specifically, for example, in a case where the observer's gaze point is at or near the left ear of the panda image in FIG. 4B, the luminance increasing processing of the black display edge including the left ear of the panda image or the luminance increasing processing of the background image is performed. Here, the control unit 101 performs the luminance increasing processing of the black display edge or the luminance increasing processing of the background image, and this processing follows the above-described [third rule between $S_{A-1}$ and $S_{A-2}$"]. As described above, since the display device includes the line-of-sight information acquisition unit that acquires the line-of-sight information of the observer, the observer can more easily recognize a display edge or the like in the area gazed by the observer.

Alternatively, in a modification example-2 of the display device of the fourth embodiment, the information of the image includes transmittance information (alpha channel), and the control unit 101 performs the luminance increasing processing of the black display edge or the luminance increasing processing of the background image on the basis of the information of the transmittance. This processing is in accordance with the aforementioned [fourth rule between $S_{A-1}$ and $S_{B-2}$]. As described above, the observer can more easily recognize the display edge and the like in the area having high transmittance.

Figure 2A:
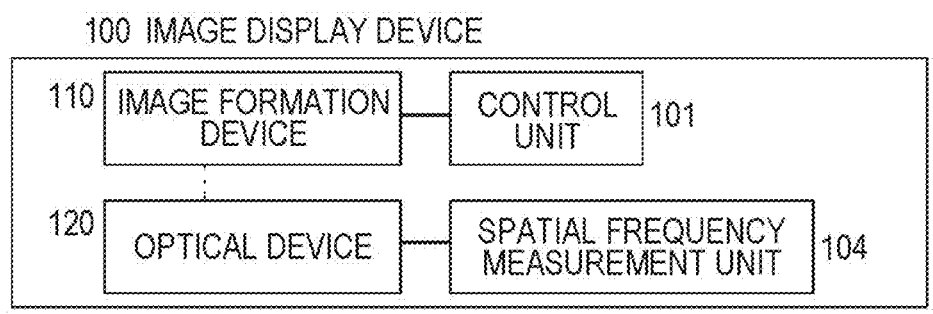
FIGS. 2A and 2B are conceptual diagrams of the display device of the fourth embodiment.

Alternatively, as illustrated in the conceptual diagram in FIG. 2A, a modification example-3 of the display device of the fourth embodiment further includes a spatial frequency measurement unit [for example, an imaging device (or a camera)] 104 that obtains a spatial frequency of a real image of the outside world in the superimposed area of an image and the real image of the outside world, and the control unit 101 performs the luminance increasing processing of the black display edge or the luminance increasing processing of a background image on the basis of a measurement result of the spatial frequency. Specifically, as the outside world (background) having a high value of the spatial frequency, a blind in which a large number of slats (blades) are arranged in the horizontal direction or the vertical direction, and a wall paper having a periodic pattern can be mentioned. On the other hand, as the outside world (background) having a low value of the spatial frequency, a wall paper having no pattern and a flat outside world can be mentioned. In a case where such an outside world (background) having a high spatial frequency exists, the control unit 101 is only required to increase the luminance of the black display edge or the background image, and this processing follows the above-described [fifth rule between $S_{A-1}$ and $S_{C-2}$]. That is, by increasing the luminance of the black display edge or the background image, a wall paper having a blind or a periodic pattern is made difficult to see. As described above, since the display device includes the spatial frequency measurement unit, the observer can more easily recognize the display edge and the like in an area that is difficult for the observer to visually recognize.

Figure 2B:
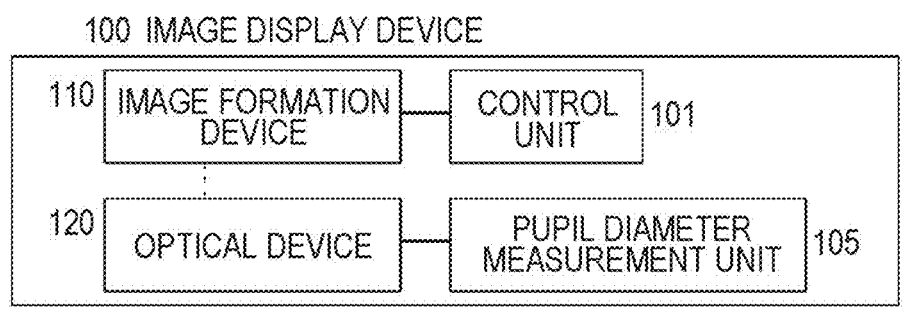

Alternatively, as illustrated in a conceptual diagram in FIG. 2B, a modification example-4 of the display device of the fourth embodiment includes a pupil diameter measurement unit 105 that measures a pupil diameter of an observer. As the pupil diameter measurement unit, a known eye tracking device (eye tracking camera) can be mentioned. By including the pupil diameter measurement unit, optimization of control of the luminance of the image, control of the luminance of the black display edge, control of the luminance of the background image, or the like can be performed.

Fifth Embodiment

Fifth to eighth embodiments are modifications of the first to fourth embodiments, and specific examples of the display device or the like of the present disclosure will be described in the fifth to eighth embodiments. The display device of the fifth embodiment is a head mounted display (HMD) in which the entire display device is mounted on the head of the observer.

Figure 12:
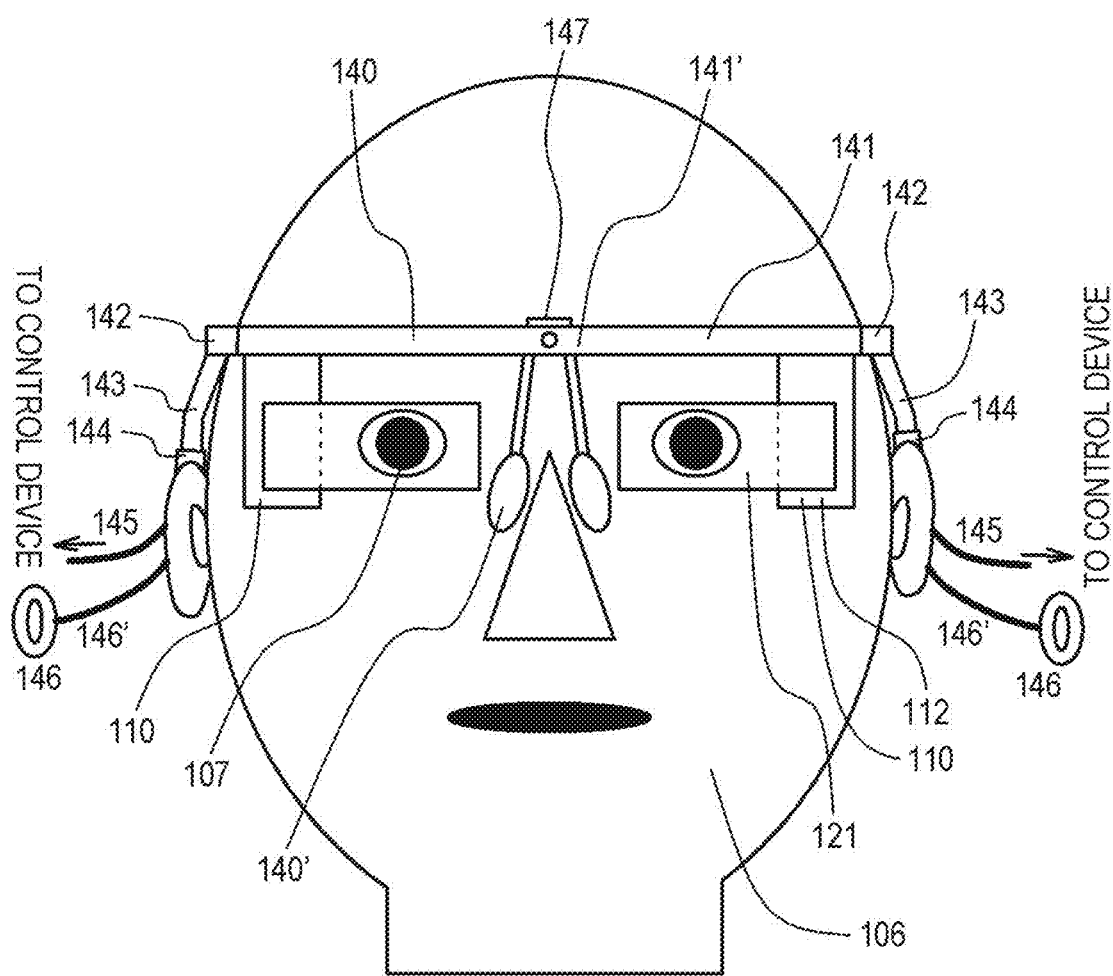
FIG. 12 is a schematic view of a head mounted display of a fifth embodiment as viewed from the front.
Figure 13:
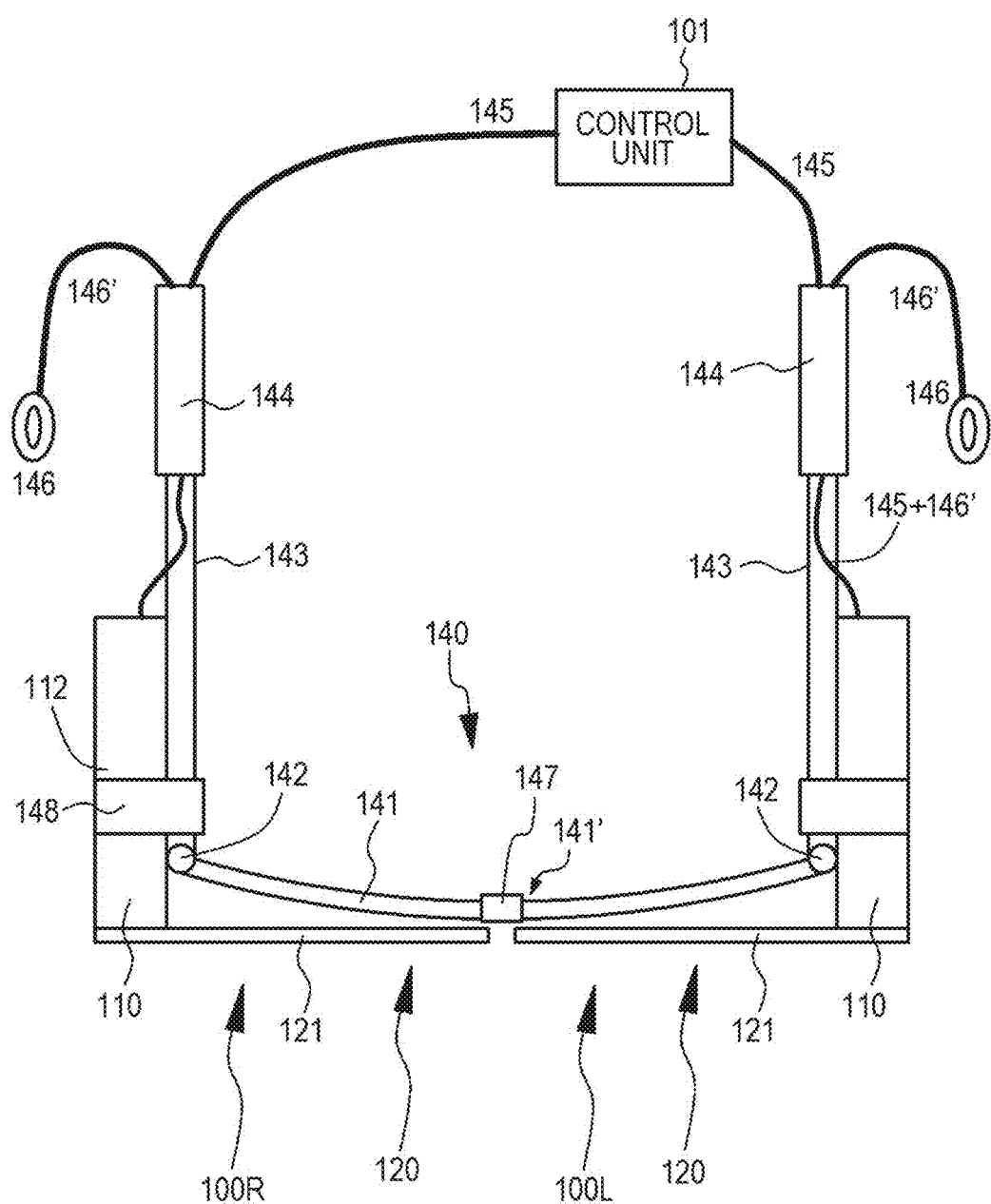
FIG. 13 is a schematic view of the head mounted display of the fifth embodiment as viewed from above.
Figure 15A:
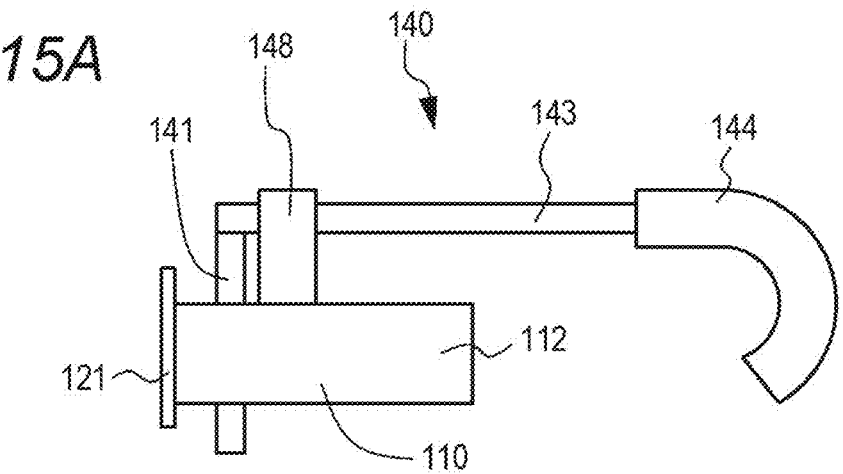
FIGS. 15A, 15B, and 15C are a schematic view of the head mounted display of the fifth embodiment as viewed from a side, a schematic cross-sectional view illustrating a part of a reflection type volume hologram diffraction grating in the display device of the fifth embodiment in an enlarged manner, and a conceptual view of a modification example of the image formation device constituting the head mounted display of the fifth embodiment, respectively.
Figure 15B:
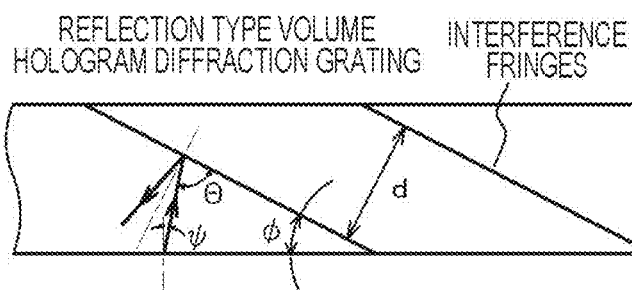

In the fifth embodiment, the display devices described in the first to fourth embodiments were applied to the head mounted display (HMD). FIG. 12 illustrates a schematic view of the head mounted display of the fifth embodiment as viewed from the front, FIG. 13 illustrates a schematic view thereof as viewed from above, and FIG. 15A illustrates a schematic view thereof as viewed from a side. Furthermore, a conceptual view of an image display device constituting the head mounted display of the fifth embodiment is illustrated in FIG. 14, and a schematic cross-sectional view illustrating a part of a reflection type volume hologram diffraction grating in the display device of the fifth embodiment in an enlarged manner is illustrated in FIG. 15B.

The optical device (eyepiece optical device) 120 in the display device of the fifth embodiment includes:
a light guide plate 121 through which a light incident from the image formation device 110 propagates by total reflection and then is emitted toward the observer 106;
a first deflection means 131 that deflects a light incident on the light guide plate 121 such that the light incident on the light guide plate 121 is totally reflected inside the light guide plate 121; and
a second deflection means 132 that deflects the light propagated by total reflection inside the light guide plate 121 in order to emit the light propagated inside the light guide plate 121 by total reflection from the light guide plate 121. Note that the term "total reflection" means total internal reflection or total reflection inside the light guide plate. The light incident from the image formation device 110 propagates inside the light guide plate 121 by total reflection, and then is emitted toward the pupil 107 of the observer 106. The second deflection means 132 forms a virtual image formation area in the optical device 120.

A portion of the optical device 120 including the light guide plate 121 and the second deflection means 132 is a semi-transmissive type (see-through type). Specifically, at least a portion of the optical device 120 facing the eyeball (pupil) 107 of the observer 106 is semi-transmissive (see-through), and an outside view can be viewed through this portion of the optical device 120. Note that in the present description, the term "semi-transmissive" may be used, but it does not mean that ½ (50%) of the incident light is transmitted or reflected, but is used in the sense that a part of the incident light is transmitted and the rest is reflected. Furthermore, a mode can be employed in which the optical device 120 further includes a dimming device that adjusts the amount of external light incident from the outside.

Here, a configuration can be employed in which the first deflection means 131 diffracts the light incident on the light guide plate 121, and the second deflection means 132 diffracts the light propagated by total reflection inside the light guide plate 121 a plurality of times. Then, in this case, a mode can be employed in which the first deflection means 131 and the second deflection means 132 can be in a form of including a diffraction grating element, and further, a configuration can be employed in which the diffraction grating element includes a reflection type diffraction grating element or includes a transmission type diffraction grating element, or one diffraction grating element includes a reflection type diffraction grating element and the other diffraction grating element includes a transmission type diffraction grating element. As the diffraction grating element, a volume hologram diffraction grating can be mentioned. The first deflection means 131 including the volume hologram diffraction grating may be referred to as a "first diffraction grating member" for convenience, and the second deflection means 132 including the volume hologram diffraction grating may be referred to as a "second diffraction grating member" for convenience. Interference fringes of the hologram diffraction grating layer extend substantially parallel to the Y axis.

Although monochromatic (for example, blue) image display can be performed by the image display device of the fifth embodiment, in a case where color image display is performed, a configuration can be employed in which, in order to correspond to diffraction reflection of P types of lights having wavelength bands (or wavelengths) of different P types (for example, P=3, and three types of red, green, and blue), the first diffraction grating member or the second diffraction grating member are formed by stacking P layers of diffraction grating layers including volume hologram diffraction gratings. The interference fringes corresponding to one type of wavelength band (or wavelength) are formed on each diffraction grating layer. Alternatively, a configuration can be employed in which in order to correspond to diffractive reflection of P types of lights having different P types of wavelength bands (or wavelengths), P types of interference fringes are formed in the first diffraction grating member or the second diffraction grating member including one diffraction grating layer. Alternatively, for example, a configuration can be employed in which the angle of view is trisected, and the first diffraction grating member or the second diffraction grating member is formed by stacking diffraction grating layers corresponding to respective angles of view. Alternatively, for example, a structure may be employed in which the first diffraction grating member and the second diffraction grating member that include a diffraction grating layer including a volume hologram diffraction grating that diffracts and reflects a light having a red wavelength band (or wavelength) are arranged on the first light guide plate, the first diffraction grating member and the second diffraction grating member that include a diffraction grating layer including a volume hologram diffraction grating that diffracts and reflects a light having a green wavelength band (or wavelength) are arranged on the second light guide plate, the first diffraction grating member and the second diffraction grating member that include a diffraction grating layer including a volume hologram diffraction grating that diffracts and reflects a light having a blue wavelength band (or wavelength) are arranged on the third light guide plate, and these first light guide plate, second light guide plate, and third light guide plate are stacked with gaps therebetween. Then, by employing these configurations, it is possible to increase diffraction efficiency, increase a diffraction reception angle, and optimize a diffraction angle when a light having each wavelength band (alternatively, the wavelength) is diffracted and reflected by the first diffraction grating member or the second diffraction grating member. It is preferable to arrange a protective member so that the volume hologram diffraction gratings do not come into direct contact with the atmosphere.

As a material constituting the first diffraction grating member and the second diffraction grating member, a photopolymer material can be mentioned. The constituent materials and basic structures of the first diffraction grating member and the second diffraction grating member including the volume hologram diffraction grating is only required to be the same as constituent materials and structures of a conventional volume hologram diffraction grating. The volume hologram diffraction grating means a hologram diffraction grating that diffracts and reflects only +first-order diffracted light. Interference fringes are formed on the diffraction grating member from an inside to a surface thereof, and a method of forming such interference fringes themselves is only required to be the same as a conventional formation method. Specifically, for example, it is only required that a member (for example, a photopolymer material) constituting the diffraction grating member is irradiated with an object light from a first predetermined direction on one side, the member constituting the diffraction grating member is simultaneously irradiated with a reference light from a second predetermined direction on the other side, and interference fringes formed by the object light and the reference light are recorded inside the member constituting the diffraction grating member. By appropriately selecting the first predetermined direction, the second predetermined direction, and wavelengths of the object light and the reference light, a desired pitch of the interference fringes on the surface of the diffraction grating member and a desired inclination angle (slant angle) of the interference fringes can be obtained. The inclination angle of the interference fringes means an angle formed by the surface of the diffraction grating member (or diffraction grating layer) and the interference fringes. In a case where the first diffraction grating member and the second diffraction grating member are formed by a stacked structure of P layers of diffraction grating layers including volume hologram diffraction gratings, stacking of such diffraction grating layers is only required such that the P layers of the diffraction grating layers are separately prepared, and thereafter the P layers of the diffraction grating layers are stacked (bonded) using, for example, an ultraviolet curable adhesive. Furthermore, after preparing one layer of a diffraction grating layer using a photopolymer material having adhesiveness, a photopolymer material having adhesiveness may be sequentially adhered thereon to prepare a diffraction grating layer, thereby preparing P layers of diffraction grating layers. By irradiating the prepared diffraction grating layer with energy rays as necessary, monomers in the photopolymer material remaining without being polymerized at the time of irradiation with the object light and the reference light of the diffraction grating layer are polymerized and fixed. Furthermore, if necessary, heat treatment is performed for stabilization.

Alternatively, a configuration can be employed in which a first deflection means 131' reflects the light incident on a light guide plate 121', and a second deflection means 132' transmits and reflects the light propagated by total reflection inside the light guide plate 121' a plurality of times. Then, in this case, a configuration can be employed in which the first deflection means 131' functions as a reflecting mirror, and the second deflection means 132' functions as a semi-transmissive mirror.

In such a configuration, the first deflection means 131' is formed by, for example, a metal containing an alloy, and can include a light reflecting film (a kind of mirror) that reflects a light incident on the light guide plate 121', a diffraction grating (for example, the hologram diffraction grating layer) that diffracts the light incident on the light guide plate 121', a multilayer stacked structure in which a large number of dielectric stacked films are stacked, a half mirror, and a polarizing beam splitter. Furthermore, the second deflection means 132' can include a multilayer stacked structure in which a large number of dielectric stacked films are stacked, a half mirror, a polarizing beam splitter, and a hologram diffraction grating layer. Then, the first deflection means 131' and the second deflection means 132' are disposed inside the light guide plate 121' (incorporated inside the light guide plate 121'), but in the first deflection means 131', a parallel light incident on the light guide plate 121' is reflected or diffracted such that a parallel light incident on the light guide plate 121' is totally reflected inside the light guide plate 121'. On the other hand, in the second deflection means 132', the parallel light propagated by total reflection inside the light guide plate 121' is reflected or diffracted a plurality of times, and is emitted from the light guide plate 121' in a state of the parallel light. In some cases, one of the first deflection means 131' and the second deflection means 132' may include the first deflection means 131 or the second deflection means 132.

Alternatively, in the image display device of the fifth embodiment, a mode can be employed in which the optical device includes a semi-transmissive mirror on which a light emitted from the image formation device is incident and emitted toward the pupil of the observer. A structure may be employed in which the light emitted from the image formation device propagates in the air to be incident on the semi-transmissive mirror, or propagates inside a transparent member (specifically, a member formed by a similar material to the material forming the light guide plate 121) such as a glass plate or a plastic plate to be incident on the semi-transmissive mirror, for example. The semi-transmissive mirror may be attached to the image formation device via the transparent member, or the semi-transmissive mirror may be attached to the image formation device via a member different from the transparent member.

In the image display device of the fifth to eighth embodiments including the various preferable modes described above, a mode can be employed in which the image formation device has a plurality of pixels arranged in a two-dimensional matrix. Note that the configuration of such an image formation device will be referred to as a "first configuration image formation device" for convenience.

As the image formation device of the first configuration, for example, an image formation device including a reflective type spatial light modulation device and a light source; an image formation device including a transmissive type spatial light modulation device and a light source; and an image formation device including a light emitting element such as an organic electroluminescence (EL) element, an inorganic EL, a light emitting diode (LED), and a semiconductor laser element can be mentioned, and among them, an image formation device including an organic EL light emitting element (organic EL display device), an image formation device including a reflective spatial light modulation device and a light source, or an image formation device including a light emitting element is preferable. As the spatial light modulation device, a transmissive type or reflective type liquid crystal display device of a light valve, for example, a liquid crystal on silicon (LCOS) or the like, and a digital micromirror device (DMD) can be mentioned, and a light emitting element can be mentioned as the light source. Moreover, a configuration can be employed in which the reflective type spatial light modulation device includes a liquid crystal display device and a polarizing beam splitter that reflects a part of light from a light source and guides the light to the liquid crystal display device, and passes a part of light reflected by the liquid crystal display device and guides the light to an optical system (or a transfer optical device). As the light emitting element constituting the light source, a red light emitting element, a green light emitting element, a blue light emitting element, and a white light emitting element can be mentioned. Alternatively, the white light may be obtained by mixing a red light, a green light, and a blue light emitted from the red light emitting element, the green light emitting element, and the blue light emitting element using a light pipe and uniformizing luminance. As the light emitting element, for example, a semiconductor laser element, a solid-state laser, and an LED can be exemplified. The number of pixels is only required to be determined on the basis of specifications required for the image formation device, and as specific values for the number of pixels, 320×240, 432×240, 640×480, 854×480, 1024×768, 1920×1080, or the like can be exemplified. In the image formation device of the first configuration, a mode can be employed in which a diaphragm is arranged at a position of a front focal point of the optical system (focal point on the image formation device side).

Alternatively, in the image display device of the fifth to eighth embodiments including the preferred modes described above, a mode can be employed in which the image formation device includes a light source and a scanning means for scanning with a light emitted from the light source and forming an image. Note that the configuration of such an image formation device will be referred to as an "image formation device of a second configuration" for convenience.

A light emitting element can be mentioned as a light source in the image formation device of the second configuration, and specifically, a red light emitting element, a green light emitting element, a blue light emitting element, and a white light emitting element can be mentioned, or a red light, a green light, and a blue light emitted from the red light emitting element, the green light emitting element, and the blue light emitting element may be mixed and subjected to uniformization of luminance with a light pipe to obtain a white light. As the light emitting element, for example, a semiconductor laser element, a solid-state laser, and an LED can be exemplified. The number of pixels (virtual pixels) in the image formation device of the second configuration is also only required to be determined on the basis of specifications required for the image formation device, and as specific values for the number of pixels (virtual pixels), 320×240, 432×240, 640×480, 854×480, 1024×768, 1920×1080, or the like can be exemplified. Furthermore, in a case of displaying a color image and a case of forming the light source by a red light emitting element, a green light emitting element, and a blue light emitting element, it is preferable to perform color synthesis using, for example, a cross prism. As the scanning means, for example, micro electro mechanical systems (MEMS) mirror having a micromirror capable of rotating in a two-dimensional direction and a galvano mirror, which horizontally and vertically scans with a light emitted from a light source, can be mentioned. In the image formation device of the second configuration, a mode can be employed in which a MEMS mirror or a galvanometer mirror is arranged at a position of a front focal point (focal point on the image formation device side) of an optical system (as described later).

In the image formation device of the first configuration or the image formation device of the second configuration, a plurality of parallel lights is incident on the light guide plate 121, 121' in an optical system (which is an optical system that causes an emitted light to be a parallel light, and may be referred to as a "parallel light emitting optical system", and specifically, for example, a collimating optical system or a relay optical system), and such a request for being a parallel light is based on the fact that light wave plane information when these lights are incident on the light guide plate 121, 121' needs to be stored even after the light is emitted from the light guide plate 121, 121' via the first deflection means 131, 131' and the second deflection means 132, 132'. In order to generate a plurality of parallel lights, specifically, for example, the light emission unit of the image formation device is only required to be positioned at a location (position) of a focal length in the parallel light emitting optical system. The parallel light emitting optical system has a function of converting position information of pixels into angle information in the optical system of the optical device. As the parallel light emitting optical system, an optical system having a positive optical power as the whole, in which a convex lens, a concave lens, a free curved prism, and a hologram lens are used alone or in combination, can be exemplified. A light shielding portion having an opening may be arranged between the parallel light emitting optical system and the light guide plate 121, 121' so that an undesirable light is not emitted from the parallel light emitting optical system and is not incident on the light guide plate 121, 121'.

In the display device of the fifth embodiment including the various preferable configurations and modes described above, a mode can be employed in which the light guide plate 121, 121' has two parallel surfaces (first surface and second surface) extending in parallel with the axis (longitudinal direction and horizontal direction) of the light guide plate 121, 121', and the light guide plate 121, 121' may include a transparent substrate. When a surface of the light guide plate 121, 121' on which a light is incident is a light guide plate incident surface and a surface of the light guide plate 121, 121' from which a light is emitted is a light guide plate emission surface, the first surface may form the light guide plate incident surface and the light guide plate emission surface, or the first surface may form the light guide plate incident surface, and the second surface may form the light guide plate emission surface. As a material constituting the light guide plate 121, 121', glass including optical glass such as quartz glass and BK7, soda lime glass, or white plate glass, and a plastic material (for example, PMMA, polycarbonate resin, a stacked structure of polycarbonate resin and acrylic resin, cycloolefin polymer, acrylic resin, amorphous polypropylene resin, and styrene resin containing AS resin) can be mentioned. The shape of the light guide plate 121, 121' is not limited to a flat plate, and may have a curved shape.

In the display devices of the fifth and sixth embodiments, a configuration can be employed in which a frame includes a front portion arranged in front of the observer and two temple portions pivotally attached to both ends of the front portion via hinges, and a configuration can be employed in which the front portion and the two temple portions are integrated. A temple tip (front cell portion) is attached to a tip portion of each temple portion as necessary. A mode can be employed in which the nose pad portion is attached to the front portion. Although the image display device is attached to the frame, specifically, for example, a housing in which the image formation device is stored inside is only required to be attached to the front portion on the temple portion side, or is only required to be attached to the temple portion, or is only required to be attached from the front portion on the temple portion side to the temple portion. Attachment of the image formation device (attachment of the housing) is only required to be performed by, for example, an appropriate method such as a method using a screw. When the entire display device of the fifth embodiment is viewed, the frame has substantially the same structure and appearance as ordinary eyeglasses or sunglasses. That is, when the entire display device of the fifth embodiment is viewed, the assembly of the frame and the nose pad portion has substantially the same structure as that of ordinary eyeglasses or sunglasses except that there is no rim. The nose pad portion can also have a known configuration and structure. A speaker or a headphone part may be attached to the temple portion. The material constituting the frame including the nose pad portion can be formed by the same material as the material forming ordinary eyeglasses or sunglasses, such as metal, alloy, plastic, or a combination thereof. In the display device of the sixth embodiment, a mode can be employed in which the optical device is attached to goggles or integrally formed with the goggles, or a mode can be employed in which the optical device is attached to a surface member (face member, mask member) having a shape similar to a disaster-prevention surface that can be worn on the head of an observer or integrally formed with the surface member.

Furthermore, in the display device of the fifth embodiment, from the viewpoint of design or ease of mounting, it is desirable to employ a mode in which a wiring (signal line, power line, or the like) from one or two image formation devices extends from a tip portion of the temple tip to the outside via the temple portion and the inside of the temple tip and connected to a control device (control circuit or control means). Moreover, a mode can be employed in which each image formation device includes a headphone part, and a wiring for the headphone part from each image formation device extends from the tip portion of the temple tip to the headphone part via the temple portion and the inside of the temple tip. As the headphone part, for example, an inner ear type headphone part and a canal type headphone part can be mentioned. More specifically, it is preferable to employ a mode in which the wiring for the headphone part extends from the tip portion of the temple tip to the headphone part so as to wrap around a back side of a pinna (auricle). Furthermore, a mode can be employed in which the imaging device is attached to a center portion of the front portion. Specifically, the imaging device includes, for example, a solid-state image sensor including a CCD or CMOS sensor and a lens. The wiring from the imaging device is only required to be connected to one image display device (or image formation device) via, for example, the front portion, and be further included in the wiring extending from the image display device (or image formation device).

Specifically, the head mounted display of the fifth embodiment includes:

(A) a frame 140 (for example, eyeglass-type frame 140) mounted on the head of the observer 106; and (B) the image display device 100 attached to the frame 140. Note that, specifically, the head mounted display of the fifth embodiment is a binocular type having two image display devices, but a single eye type having one may be used. The image display device 100 may be fixedly attached or detachably attached to the frame 140. The head mounted display is, for example, a direct drawing type head mounted display that directly draws an image on the pupil 107 of the observer 106.

The light guide plate 121 has a first surface 122 on which a light from the image formation device 110 is incident and a second surface 123 facing the first surface 122. That is, the light guide plate 121 formed by optical glass or plastic material has two parallel surfaces (the first surface 122 and the second surface 123) extending in parallel with the light propagation direction (X direction) due to total internal reflection of the light guide plate 121. The first surface 122 and the second surface 123 face each other. Then, the first deflection means 131 is arranged (specifically, bonded) on the second surface 123 of the light guide plate 121, and the second deflection means 132 is arranged (specifically, bonded) on the second surface 123 of the light guide plate 121.

The first deflection means (first diffraction grating member) 131 includes a hologram diffraction grating, specifically, a reflection type volume hologram diffraction grating, and the second deflection means (second diffraction grating member) 132 also includes a hologram diffraction grating, specifically, a reflection type volume hologram diffraction grating. First interference fringes are formed inside the hologram diffraction grating constituting the first deflection means 131, and second interference fringes are formed inside the hologram diffraction grating constituting the second deflection means 132.

The first deflection means 131 diffracts and reflects the parallel light incident on the light guide plate 121 from the second surface 123 so that the parallel light is totally reflected inside the light guide plate 121. The second deflection means 132 diffracts and reflects the light propagated by total reflection inside the light guide plate 121, and guides the light to the pupil 107 of the observer 106. The second deflection means 132 forms a virtual image formation area in the light guide plate 121. Axes of the first deflection means 131 and the second deflection means 132 are parallel to the X direction, and normals thereof are parallel to the Z direction. In each reflection type volume hologram diffraction grating formed by a photopolymer material, interference fringes corresponding to one type of wavelength band (or wavelength) are formed, and are produced by a conventional method. The pitch of the interference fringes formed in the reflection type volume hologram diffraction grating is constant, and the interference fringes are linear and parallel to the Y direction.

FIG. 15B is an enlarged schematic partial cross-sectional view of the reflection type volume hologram diffraction grating. Interference fringes having an inclination angle (slant angle) $\varphi$ are formed on the reflection type volume hologram diffraction grating. Here, the inclination angle $\varphi$ refers to an angle formed by the surface of the reflection type volume hologram diffraction grating and the interference fringes. The interference fringes are formed from an inside of the reflection type volume hologram diffraction grating to the surface. The interference fringes satisfy the Bragg condition. Here, the Bragg condition refers to a condition that satisfies the following equation (A). In equation (A), m means a positive integer, $\Lambda$ means a wavelength, d means a pitch of a grating surface (interval in a normal direction of a virtual plane including the interference fringes), and θ means a margin of an angle of incidence on the interference fringes. Furthermore, the relationship among θ, the inclination angle φ, and an incident angle ψ in a case where a light enters the diffraction grating member at the incident angle ψ is as indicated in equation (B).

$$m \cdot \lambda = 2 \cdot d \cdot \sin(\Theta) \tag{A}$$

$$\Theta = 90° - (\varphi + \psi) \tag{B}$$

The entire image formation device 110 is housed in a housing 112. Note that an optical system through which an image emitted from the image formation device 110 passes may be arranged in order to control a display dimension, a display position, and the like of the image emitted from the image formation device 110. What kind of optical system is arranged depends on specifications required for the head mounted display and the image formation device 110.

The frame 140 includes a front portion 141 arranged in front of the observer 106, two temple portions 143 pivotally attached to both ends of the front portion 141 via hinges 142, and a temple tip (also called a tip cell, earpiece, ear pad) 144 attached to a tip portion of each temple portion 143. Furthermore, nose pad portions 140' are attached. That is, the assembly of the frame 140 and the nose pad portions 140' basically has substantially the same structure as ordinary eyeglasses. Moreover, each housing 112 is attached to the temple portion 143 by an attachment member 148. The frame 140 includes metal or plastic. Note that each housing 112 may be detachably attached to the temple portion 143 by the attachment member 148. Furthermore, for an observer who owns and wears eyeglasses, each housing 112 may be detachably attached to the temple portion 143 of the frame 140 of the eyeglasses owned by the observer by the attachment member 148. Each housing 112 may be attached to the outside of the temple portion 143 or may be attached to the inside of the temple portion 143. Alternatively, the light guide plate 121 may be fitted into a rim provided in the front portion 141.

Moreover, a wiring (signal line, power line, or the like) 145 extending from one of the image formation devices 110 extends from the tip portion of the temple tip 144 to the outside via the temple portion 143 and the inside of the temple tip 144, and is connected to the control unit 101. Moreover, each image formation device 110 includes the headphone part 146, and the wiring 146' for the headphone part extending from each image formation device 110 extends from the tip portion of the temple tip 144 to the headphone part 146 via the temple portion 143 and the inside of the temple tip 144. More specifically, the wiring 146' for the headphone part extends from the tip portion of the temple tip 144 to the headphone part 146 so as to wrap around the back side of the pinna (auricle). With such a configuration, it is possible to obtain a neat head mounted display without giving an impression that the headphone part 146 and the wirings 146' for the headphone part are randomly arranged.

As described above, the wiring (signal line, power line, or the like) 145 is connected to the control unit 101, and processing for image display is performed in the control unit 101.

A camera 147 including a solid-state imaging element including a CCD or CMOS sensor and a lens (not illustrated) is attached to a center portion 141' of the front portion 141 by an appropriate attachment member (not illustrated) as necessary. A signal from the camera 147 is transmitted to the control unit 101 via a wiring (not illustrated) extending from the camera 147.

In the image display device of the fifth embodiment, a light (which corresponds to, for example, the size of one pixel or one sub-pixel) emitted from the display device at a certain moment is a parallel light. Then, this light reaches the pupil 107 (specifically, the crystalline lens) of the observer 106, and the light passing through the crystalline lens finally forms an image on the retina of the pupil 107 of the observer 106.

The image formation device 110 is the image formation device of the first configuration, and includes a plurality of pixels arranged in a two-dimensional matrix. Specifically, as illustrated in FIG. 14, the image formation device 110 includes an organic EL display device 151A. The image emitted from the organic EL display device 151A passes through a first convex lens 151B constituting the optical system, further passes through a second convex lens 151D constituting the optical system, becomes a parallel light, and travels toward the light guide plate 121. A front focal point $f_{2F}$ of the second convex lens 151D is located at a rear focal point $f_{1B}$ of the first convex lens 151B. Furthermore, a diaphragm 151C is arranged at a position of the rear focal point $f_{1B}$ of the first convex lens 151B (the front focal point $f_{2F}$ of the second convex lens 151D). The diaphragm 151C corresponds to an image emission unit. The entire image formation device 110 is housed in the housing 112. The housing 112 is attached to the frame 140 by appropriate means. The organic EL display device 151A includes a plurality of (for example, 640×480) pixels (organic EL elements) arranged in a two-dimensional matrix.

Figure 15C:
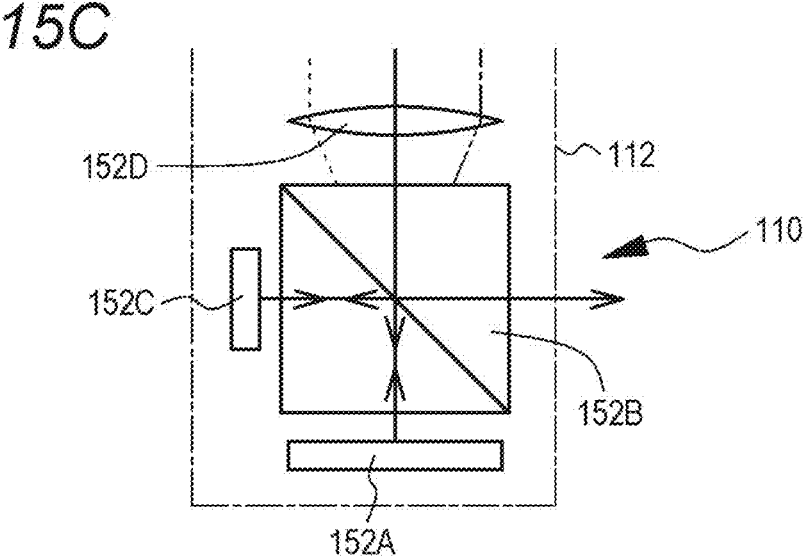

Alternatively, as illustrated in FIG. 15C, the image formation device 110 is the image formation device of the first configuration, and includes a plurality of pixels arranged in a two-dimensional matrix. Specifically, the image formation device 110 includes a reflective type spatial light modulation device and a light source 152C including a light emitting diode that emits a white light. The image formation device 110 is housed entirely in the housing 112 (indicated by an alternate long and short dash line in FIG. 15C), the housing 112 is provided with an opening (not illustrated), and a light is emitted from an optical system (parallel light emitting optical system, collimating optical system 152D) through the opening. The housing 112 is attached to the frame 140 by appropriate means. The reflective type spatial light modulation device includes a liquid crystal display device (LCD) 152A including an LCOS as a light bulb. Moreover, there is provided a polarizing beam splitter 152B that reflects a part of light from the light source 152C and guides the light to the liquid crystal display device 152A, and also passes a part of light reflected by the liquid crystal display device 152A and guides the light to the optical system 152D. The liquid crystal display device 152A includes a plurality of (for example, 640×480) pixels (liquid crystal cells, liquid crystal display elements) arranged in a two-dimensional matrix. The polarizing beam splitter 152B has a known configuration and structure. An unpolarized light emitted from the light source 152C collides with the polarizing beam splitter 152B. In the polarizing beam splitter 152B, a P polarization component passes through and is emitted to the outside of the system. On the other hand, an S polarization component is reflected by the polarizing beam splitter 152B, enters the liquid crystal display device 152A, is reflected inside the liquid crystal display device 152A, and is emitted from the liquid crystal display device 152A. Here, among lights emitted from the liquid crystal display device 152A, a light emitted from a pixel displaying "white" contains a large amount of P polarization components, and a light emitted from a pixel displaying "black" contains a large amount of S polarization components. Therefore, among lights emitted from the liquid crystal display device 152A and colliding with the polarizing beam splitter 152B, P polarization components pass through the polarizing beam splitter 152B and are guided to the optical system 152D. On the other hand, S polarization components are reflected by the polarizing beam splitter 152B and returned to the light source 152C. The optical system 152D includes, for example, a convex lens, and the image formation device 110 (more specifically, the liquid crystal display device 152A) is arranged at a location (position) of a focal length in the optical system 152D in order to generate a parallel light. The image emitted from the image formation device 110 reaches the pupil 107 of the observer 106 via the light guide plate 121.

Alternatively, as illustrated in a conceptual view of modification example-1 of the image formation device 110 in FIG. 16, the image formation device 110 is an image formation device of the second configuration, and includes a light source 153A, a scanning means 153B that two-dimensionally scans a parallel light emitted from the light source 153A, and an optical system 153C that converts a light emitted from the light source 153A into a parallel light. The entire image formation device 110 is housed in the housing 112, an opening (not illustrated) is provided in the housing 112, and a light is emitted from the optical system 153C through the opening. Then, the housing 112 is attached to the frame 140 by an appropriate means. The light source 153A includes, for example, a semiconductor laser element. Then, the light emitted from the light source 153A is converted into a parallel light by a lens that is not illustrated, with which horizontal scanning and vertical scanning are performed by the scanning means 153B including a MEMS mirror that has a micromirror rotatable in two-dimensional directions and can two-dimensionally scan an incident parallel light, so as to form a kind of two-dimensional image, thereby generating virtual pixels (whose number of pixels is, for example, 640×480). Then, the light from the virtual pixel (the scanning means 153B corresponding to the image emission unit) passes through the optical system 153C having positive optical power, and the light flux converted into the parallel light is incident on the light guide plate 121.

Alternatively, as illustrated in a conceptual view of modification example-2 of the image formation device in FIG. 17, the image formation device 110 is the image formation device of the first configuration, and the first deflection means 131' and the second deflection means 132' are disposed inside the light guide plate 121'. Then, the first deflection means 131' reflects the light incident on the light guide plate 121', and the second deflection means 132' transmits and reflects the light propagated by total reflection inside the light guide plate 121' a plurality of times. That is, the first deflection means 131' functions as a reflecting mirror, and the second deflection means 132' functions as a semi-transmissive mirror. More specifically, the first deflection means 131' provided inside the light guide plate 121' is formed by aluminum (Al), and includes a light reflecting film (a kind of mirror) that reflects the light incident on the light guide plate 121'. On the other hand, the second deflection means 132' provided inside the light guide plate 121' includes a multilayer stacked structure in which a large number of dielectric stacked films are stacked. The dielectric stacked film includes, for example, a $TiO_2$ film as a high dielectric constant material and a $SiO_2$ film as a low dielectric constant material. Japanese Translation of PCT International Application Publication No. 2005-521099 discloses a multilayer stacked structure in which a large number of dielectric stacked films are stacked. Although six dielectric stacked films are illustrated in the drawings, it is not limited thereto. A thin piece formed by the same material as the material constituting the light guide plate 121' is sandwiched between the dielectric stacked film and the dielectric stacked film. In the first deflection means 131', the parallel light incident on the light guide plate 121' is reflected so that the parallel light incident on the light guide plate 121' is totally reflected inside the light guide plate 121'. On the other hand, in the second deflection means 132', the parallel light propagated by total reflection inside the light guide plate 121' is reflected a plurality of times, and is emitted from the light guide plate 121' toward the pupil 107 of the observer 106 in the state of the parallel light.

Alternatively, as illustrated in a conceptual view of modification example-4 of the image formation device in FIG. 18, the image formation device 110 can include the image formation device (image formation device having the second configuration) illustrated in FIG. 16.

On the light guide plate 121, 121' described above, a dimming device that adjusts the amount of external light incident from the outside may be disposed.

Sixth Embodiment

Figure 19A:
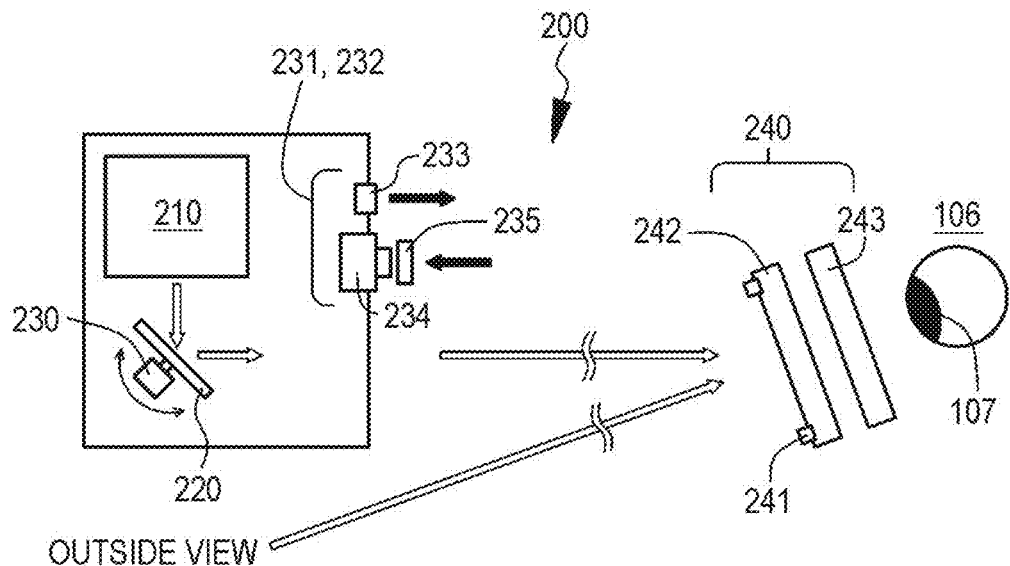
FIGS. 19A and 19B are a conceptual view of a display device of a sixth embodiment and a diagram illustrating control of a transfer optical device and an image formation device based on an image (position information of a retroreflective marker) acquired by a first position detection device and an image (position information of a pupil of an observer) acquired by a second position detection device in the display device of the sixth embodiment, respectively.

A display device of a sixth embodiment is a display device in a form such that the optical device is mounted on the observer and the image formation device and the control unit are arranged separately from the observer, and is a direct drawing type display device (a retinal projection type display device based on Maxwell vision) that directly draws an image. A conceptual view of a display device of the sixth embodiment is illustrated in FIG. 19A, and a schematic view of the display device of the sixth embodiment as viewed from the front is illustrated in FIG. 20.

Incidentally, even in the display device of the sixth embodiment, since superimposition of an image and a real image of the outside world is required, it is desirable that an image formation device 210 is not positioned in front of the observer 106. If the image formation device 210 constantly enters the field of view of the observer 106, the observer 106 may not be able to be immersed in the image or the real image of the outside world. Therefore, the image formation device 210 is desirably arranged at a position other than the front of the observer 106. Then, consequently, the observer 106 can observe the image and the outside view (real image of the outside world) in a state where the image formation device 210 does not enter the field of view of the observer 106. That is, the display device can be a semi-transmissive (see-through) type, and an outside view can be viewed through an optical device 240. However, if the image formation device 210 (specifically, a transfer optical device 220) is arranged at a position other than the front of the observer 106, the projection light obliquely enters the optical device 240. Consequently, the focal position of the optical device 240 is shifted from the pupil 107 of the observer 106, and there is a risk that the image does not reach the pupil 107 of the observer 106.

A display device of the sixth embodiment includes an image display device 200 and a control unit (not illustrated), the image display device 200 includes
an image formation device 210,
the optical device (eyepiece optical device) 240 that displays an image emitted from the image formation device 210 in front of the observer 106 while superimposing the image on a real image of an outside world, and a transfer optical device 220 that emits an image incident from the image formation device 210 to the optical device 240, in which the optical device 240 and the image formation device 210 are arranged by spatially separating from each other, and the optical device 240 forms the image from the transfer optical device 220 on the retina of the observer 106.

Moreover, the image display device 200 includes, for example, a first position detection device 231 that detects a position of the optical device 240;

a second position detection device 232 that detects the position of a pupil 107 of the observer 106, and a transfer optical device-control device 230, in which on the basis of position information of the optical device 240 detected by the first position detection device 231 and position information of the pupil 107 of the observer 106 detected by the second position detection device 232, the transfer optical device-control device 230 controls the transfer optical device 220 so that the image incident from the image formation device 210 reaches the optical device 240.

Specifically, the optical device 240 includes a diffraction member 242 having a diffraction function and a light collecting member 243 having a light collecting function, and has wavelength dependency on diffraction characteristics. The diffraction member 242 is only required to include, for example, a transmission type volume hologram diffraction grating including a hologram diffraction grating similar to that described in the fifth embodiment, and the light collecting member 243 is only required to include, for example, a hologram lens. Alternatively, the diffraction member 242 and the light collecting member 243 can be formed by one member. Regarding the order of arrangement of the diffraction member 242 and the light collecting member 243, the light collecting member 243 may be arranged on the observer side, or the diffraction member 242 may be arranged on the observer side. The optical device 240 is attached to a rim portion of the frame 140 having substantially the same structure as ordinary eyeglasses.

The second position detection device 232 includes a light emission unit 233 that emits an infrared ray and a light reception unit 234 that receives an infrared ray reflected by the pupil 107 of the observer 106. The light emission unit 233 can include, for example, a light emitting diode that emits an infrared ray or a combination of a semiconductor laser element that emits an infrared ray and a light diffusion plate. The light reception unit 234 can include an imaging device (infrared camera) or a sensor (infrared sensor) capable of detecting infrared rays. By mounting the filter (infrared transmitting filter) 235 that passes only the wavelength of the infrared ray to be used for detection in front of the imaging device, the image processing in the subsequent stage can be simplified.

Note that the infrared ray emitted from the light emission unit 233 and the infrared ray returning to the light reception unit 234 are indicated by black arrows, and light fluxes of visible light (image) emitted from the transfer optical device 220 are indicated by white arrows.

The projection light emitted from the transfer optical device 220 is deflected by the diffraction member 242, is changed in traveling angle (direction), enters the light collecting member 243, is collected by the light collecting member 243, and forms an image on the retina of the observer 106. By providing the diffraction member 242 in this manner, the projection light obliquely enters the optical device 240, but the focal position of the optical device 240 can be prevented from deviating from the pupil 107 of the observer 106 and the image reliably reaches the pupil 107 of the observer 106.

On the other hand, the light emission unit 233 illuminates the whole head of the observer 106. A part of the infrared ray emitted from the light emission unit 233 is reflected by the diffraction member 242 (or a retroreflective marker 241 attached to the diffraction member 242) and enters the light reception unit 234. Thus, the position of the optical device 240 can be detected and the position can be specified. Furthermore, the remaining part of the infrared ray emitted from the light emission unit 233 is deflected by the diffraction member 242, changed in the traveling angle (direction), and incident on the light collecting member 243 but passes through the light collecting member 243 without being collected by the light collecting member 243 (that is, without being affected by the light collecting member 243), collides with the pupil 107 of the observer 106, is reflected by the pupil 107 of the observer 106, passes through the light collecting member 243, is deflected by the diffraction member 242, is changed in the traveling angle (direction), and is incident on the light reception unit 234. As described above, the position of the pupil 107 of the observer 106 can be detected and the position can be specified. Note that a mode can be employed in which the position of the image formed in the image formation device 210 is corrected on the basis of the position information of the optical device 240 detected by the first position detection device 231 and the position information of the pupil 107 of the observer 106 detected by the second position detection device 232.

As wavelength selectivity of the light collecting function, it is required to operate only on the wavelength of the light emitted from the image formation device 210. When the wavelength selectivity of the light collecting function is weakened and the optical device 240 collects a light (for example, a light of an outside view) having a wavelength other than the wavelength of a light emitted from the image formation device 210, it becomes difficult for the observer 106 to observe the outside view (real image of the outside world), and there is a possibility that it becomes difficult for the light reception unit 234 to recognize the position of the pupil 107 of the observer 106. On the other hand, as the wavelength selectivity of the diffraction function, in addition to the wavelength of the light emitted from the image formation device 210, it is required to operate on a wavelength (for example, in a case where an infrared camera is used, a wavelength of an infrared ray is used) used for position detection of the pupil 107 of the observer 106. Therefore, in some cases, the diffraction member 242 may include a plurality of diffraction members having wavelength selectivity, and the light collecting member 243 may include a plurality of light collecting members having wavelength selectivity.

Here, specifically, in the sixth embodiment, the light emission unit 233 and the light reception unit 234 are disposed together with the image formation device 210 in order to reduce the mounting load on the optical device 240 of the observer 106. Then, the light reception unit 234 is arranged such that the position of the pupil 107 of the observer 106 can be detected by the light reception unit 234 (imaging device and infrared camera) and a sensor (infrared sensor). In some cases, the light emission unit 233 may be separated from the image display device 200 and arranged at a place different from the image display device 200, or the light reception unit 234 may be separated from the image display device 200 and arranged at a place different from the image display device 200.

However, regardless of the mode, it is important that the light reception unit 234 is arranged at a position where the pupil 107 of the observer 106 can be seen (that is, it is directly viewed or indirectly viewed). That is, it is important to set the positional relationship among the second position detection device 232, the optical device 240, and the pupil 107 of the observer 106 to such a positional relationship that the pupil 107 of the observer 106 can be detected from the second position detection device 232. Furthermore, it is also important to provide optical characteristics to the second position detection device 232 so that the pupil 107 of the observer 106 can be detected from the second position detection device 232.

As described above, it is preferable to employ a configuration in which the infrared ray emitted from the light emission unit 233 is not affected by a light collection characteristic of the optical device 240 or is hardly affected by the light collection characteristic of the optical device 240. That is, specifically, the infrared ray emitted from the light emission unit 233 is affected by the diffraction characteristic of the optical device 240, but is not affected by the light collection characteristic of the optical device 240. Alternatively, it is preferable to employ a configuration in which the infrared ray emitted from the light emission unit 233 is not collected by the light collecting member 243 constituting the optical device 240, or is slightly collected. The optical device 240 collects a visible light emitted from the image formation device 210 to form an image on the retina of the observer 106, while the infrared ray emitted from the light emission unit 233 is not collected by the optical device 240. The infrared ray emitted from the light emission unit 233 does not interfere with the image and has a wavelength band for which the reflectance of the pupil 107 of the observer 106 is high.

Note that, in a case where a lens member formed by general optical glass is used as the optical device, there is no wavelength selectivity, and all visible lights are collected and reach the retina of the observer 106, so that the observer 106 can observe only the projected image and cannot observe the outside view. Furthermore, the pupil 107 of the observer 106 cannot be detected from the second position detection device 232 through the optical device, and the arrangement position of the second position detection device 232 is greatly restricted.

The retroreflective marker 241 is a light reflective component manufactured so that an incident light and a reflected light are in the same direction, and by using this characteristic, in principle, the reflected light always returns to the first position detection device 231 even if the observer 106 greatly moves. Consequently, the position of the retroreflective marker 241 can be detected regardless of the relative positional relationship between the first position detection device 231 and the retroreflective marker 241. The retroreflective marker 241 is desirably in a camouflage color with respect to the frame 140.

The image formation device 210 includes a light source similar to the light source 153A described in the fifth embodiment. The transfer optical device 220 includes a movable mirror. When the horizontal direction (X-axis direction) and the vertical direction (Y-axis direction) are defined with reference to the observer 106, the movable mirror moves the image incident from the image formation device 210 in the horizontal direction and the vertical direction. As the transfer optical device 220, for example, a mirror or a MEMS mirror rotatable in a two-dimensional direction can be mentioned, and the transfer optical device 220 can be formed by a movable mirror movable with respect to three axes.

The wavelength range and whether the diffraction function and the light collecting function need to operate are summarized in Table 1. By imparting such an optical function to the optical device 240, the degree of freedom in installation of the image formation device 210 is increased and the observer 106 can observe the image and the real image of the outside world in a superimposed manner, and at the same time, the pupil 107 of the observer 106 can be detected by the second position detection device 232 through the optical device 240.

TABLE 1

|  | Wavelength example | Diffraction function | Light collecting function |
| --- | --- | --- | --- |
| Transfer optical device (video light source) | $\lambda$ = near 450 nm | Operate | Operate |
|  | $\lambda$ = near 520 nm | Operate | Operate |
|  | $\lambda$ = near 640 nm | Operate | Operate |
| Second position detection device | $\lambda$ = near 850 nm | Operate | Not operate |
| Others (outside view or the like) | Other than the above | Not operate | Not operate |

In the display device of the sixth embodiment, on the basis of the position information of the optical device 240 detected by the first position detection device 231 and the position information of the pupil 107 of the observer 106 detected by the second position detection device 232, the transfer optical device-control device 230 controls the transfer optical device 220 such that the image incident from the image formation device 210 reaches the optical device 240. However, a mode can be employed in which the transfer optical device 220 is controlled such that all images incident from the image formation device 210 reach the optical device 240, or a mode can be employed in which the transfer optical device 220 is controlled such that a part of the image incident from the image formation device 210 reaches the optical device 240.

Figure 19B:
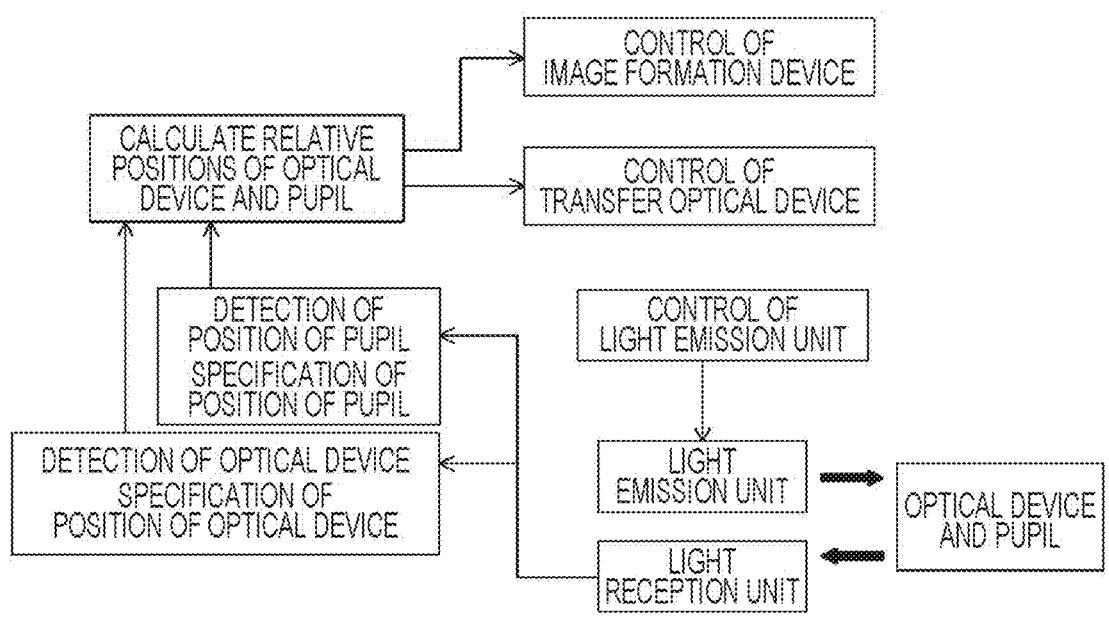

FIG. 19B illustrates control of the transfer optical device 220 and the image formation device 210 on the basis of the image (position information of the retroreflective marker 241) acquired by the first position detection device 231 and the image (position information of the pupil 107 of the observer 106) acquired by the second position detection device 232.

That is, first, the light emission unit 233 constituting the first position detection device 231 and the second position detection device 232 irradiates the periphery of the head of the observer 106 with the infrared ray. Then, an image including the retroreflective marker 241 and an infrared ray reflected by the pupil 107 of the observer 106 is captured by the light reception unit (infrared camera) 234.

Next, the obtained signal and noise are sorted on the basis of a method such as pattern recognition or shape recognition, the position of the retroreflective marker 241 is detected and the position is specified, and the position of the pupil 107 of the observer 106 is detected and the position is specified. A method of detecting the position of the pupil 107 is widely known as a line-of-sight detection technique, and can be obtained from the center of gravity of a reflection area or the boundary of a differential image using the fact that infrared reflectance of the pupil 107 is high. A drive circuit (not illustrated) of the light emission unit 233 may be equipped with a modulation function (specifically, for example, a pulsed infrared ray is emitted from the light emission unit 233) and used for image recognition.

Then, the position of the optical device 240 is detected by the first position detection device 231, and the position of the pupil 107 of the observer 106 is detected by the second position detection device 232. Then, on the basis of these two detection results, the transfer optical device-control device 230 controls the inclination of the transfer optical device 222 so that the image is formed on the retina of the observer 106 even if the positional relationship between the optical device 240 and the pupil 107 of the observer 106 changes. The transfer optical device-control device 230 has a known configuration and structure.

As described above, while the position of the optical device 240 is detected and specified by the first position detection device 231, the position of the pupil 107 of the observer 106 is detected and specified by the second position detection device 232. Either of these processes may be performed first, or may be performed simultaneously.

As described above, in the display device of the sixth embodiment, a mode can be employed in which the optical device 240 and the image formation device 210 are relatively movable. That is, the image formation device 210 is arranged away from the observer 106, or the image formation device 210 is arranged at a portion of the observer 106 away from the head of the observer 106. In the latter case, although not limited, for example, the image formation device 210 is worn as a wearable device at a site away from the head of the observer 106, such as a wrist of the observer 106. Alternatively, the image formation device 210 is arranged in a personal computer or is arranged in a state of being connected to the personal computer. Alternatively, a mode can be employed in which the optical device 240 is arranged at a position away from the observer 106, that is, the optical device 240 may not be attached to the observer 106. Such a mode will be described in a seventh embodiment.

Examples of use of the display device of the sixth embodiment will be described below.

Figure 21A:
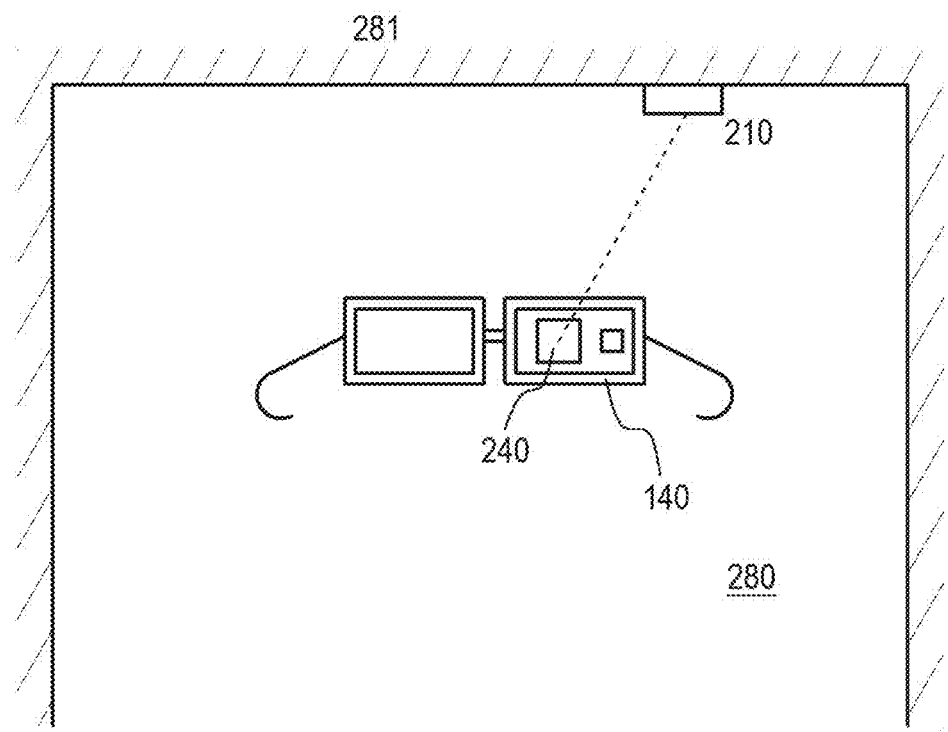
FIGS. 21A and 21B are views schematically illustrating a usage example of a display device of the sixth embodiment.

(A) Example in which an image formation device or the like for a passenger is attached to a back surface of a back (backrest) of a seat of a vehicle or an aircraft (B) Example in which an image formation device or the like for a spectator is attached to a back surface of a back (backrest) of a seat of a theater or the like (C) Example in which an image formation device or the like for a driver or the like is attached to a vehicle, an aircraft, an automobile, a motorcycle, a bicycle, or the like (D) Example of use as an alternative to a monitor used in a personal computer, a mobile phone, a smartwatch, or the like (E) Example of use as an alternative to a display used in an automated teller machine in a financial institution (F) Example of use as an alternative to a display or a touch panel used in a store or an office (G) Example of enlarging and displaying the screen of a mobile phone or personal computer (H) Example of use as an alternative to a display plate or the like used in a museum, an amusement park, or the like (I) Example in which an image formation device or the like for a customer is attached to a table in a coffee shop, a cafe, or the like FIG. 21A illustrates a usage example of the display device of the sixth embodiment, and FIG. 21A is a schematic view of a state in which the display device of the sixth embodiment is used indoors. An image formation device 210 and the like are disposed on a wall surface 281 of a room 280. When the observer 106 stands at a predetermined position in the room 280, the image from the image formation device 210 reaches the optical device 240, and the observer 106 can observe the image via the optical device 240.

Figure 21B:
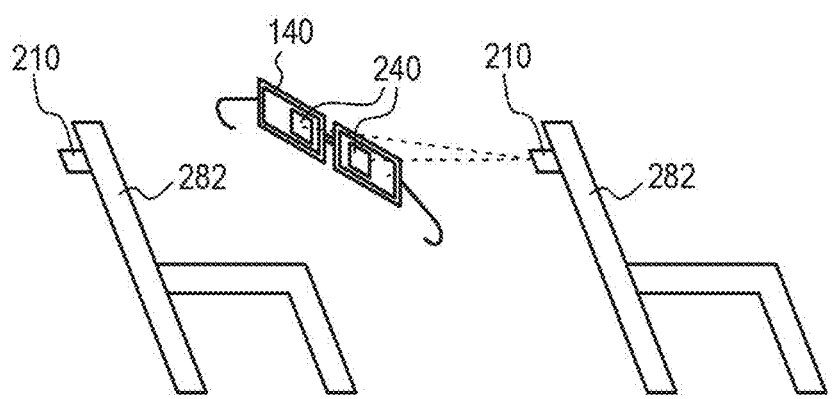

Alternatively, another usage example of the display device of the sixth embodiment is illustrated in FIG. 21B, which is a schematic view of a state in which the image formation device 210 and the like constituting the display device of the sixth embodiment are disposed on a back surface of a back (backrest) of a seat 282 and used. When the observer 106 is seated on the seat 282 on the rear side, an image is emitted from the image formation device 210 disposed on the back surface of the back of the front seat 282 toward the optical device 240 worn by the observer 106 and reaches the optical device 240, and the observer 106 can observe the image via the optical device 240. More specifically, an example in which the image formation device 210 or the like for a passenger is attached to a back surface of a back (backrest) of a seat of a vehicle or an aircraft, and an example in which the image formation device 210 or the like for a spectator is attached to a back surface of a back (backrest) of a seat of a theater or the like can be exemplified.

As described above, the display device of the sixth embodiment includes the image formation device 210, the first position detection device 231, and the second position detection device 232 that are arranged by spatially separating from the optical device 240. Then, since the transfer optical device 220 is controlled by the transfer optical device-control device 230 provided in the image display device 200, it is possible to cause the image to reliably reach the pupil 107 of the observer 106 without imposing a burden on the observer 106.

A mode can be employed in which the image formation device 210 may be arranged in front of the observer 106. Note that, as long as it is arranged in front of the observer 106, although depending on the specifications of the transfer optical device 220 and the optical device 240, the image formation device 210 may be located at a position higher than the head of the observer 106, may be located at the same level as the head of the observer 106, may be located at a position lower than the head of the observer 106, or may be located obliquely with respect to the observer 106.

As described above, the image generated by the image formation device 210 is incident on the transfer optical device 220 in the state of a parallel light (alternatively, substantially parallel light), reflected by the transfer optical device 220, and then made into a light flux directed to the optical device 240. In the optical device 240, the pupil 107 of the observer 106 is arranged at the position of the focal point (focal length $f_0$) of the optical device 240, the projected light flux is collected by the optical device 240, passes through the pupil 107 of the observer 106, and is thereby directly drawn on the retina, and the observer 106 can recognize the image.

The display device of the sixth embodiment includes the image display device 200 and the first position detection device 231 and the second position detection device 232 that are arranged by spatially separating from the optical device 240, and the transfer optical device 220 is controlled by the transfer optical device-control device 230 included in the image display device 200. Furthermore, the optical device 240 attached to the observer 106 has a quite simple structure and does not require a battery or the like for driving since there is no drive unit, and it is possible to easily achieve miniaturization and weight reduction of the optical device 240. Then, it is not a structure that imposes a burden on the observer 106, such as an increase in the mass or size of the optical device 240, and it is possible to cause the image to reliably reach the pupil 107 of the observer 106 without imposing a burden on the observer 106.

Figure 22:
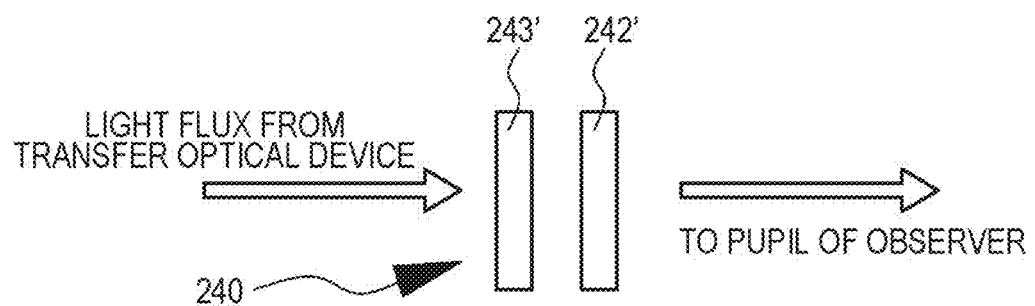
FIG. 22 is a schematic view illustrating a modification example of arrangement of a diffraction member and a light collecting member in the display device of the sixth embodiment.

FIG. 22 is a schematic view illustrating a modification example of arrangement of the diffraction member and the light collecting member in the display device of the sixth embodiment. In this modification example of the display device of the sixth embodiment, the optical device includes a diffraction grating 242', and further includes a light collecting member 243' on the light incident side. Note that the light collecting member 243' may be provided between the diffraction grating 242' and the pupil 107 of the observer 106. Then, a structure equivalent to that a plurality of focal points of the optical device 240 exists is thereby obtained. That is, even in a case where the image emitted from the transfer optical device 220 no longer reaches the pupil 107 of the observer 106 for various reasons, for example, the first-order diffracted light, –first-order diffracted light, or the like, instead of zeroth-order diffracted light of the diffraction grating 242', reaches the pupil 107 of the observer 106, so that a system with higher robustness for the observer 106 can be achieved. That is, it is possible to achieve a display device with higher robustness while reducing the burden on the observer 106. Furthermore, since a plurality of focal points can be prepared, the range in which the observer 106 can observe the image can be enlarged.

By the diffraction grating 242', a mode of dividing an image into three images in the horizontal direction, a mode of dividing into three images in the vertical direction, a mode of dividing into three images in the horizontal direction, a mode of dividing into three images in a cross shape in the vertical direction (one image including the center light path overlaps and thus is divided into a total of five images), a mode of dividing an image into two images in the horizontal direction and two images in the vertical direction, 2×2=4, and a mode of dividing an image into three images in the horizontal direction and three images in the vertical direction, 3×3=9, can be exemplified.

In a case where the observer 106 is lost, it may be unclear in which direction the transfer optical device 220 should be directed. In order to cope with such a case, it is only required to arrange another camera for detecting the observer 106 for absolute coordinate recognition. Such a camera does not require high performance with respect to the resolution and the image capturing speed, and thus a relatively inexpensive camera can be used. Alternatively, two types of tracking mode and search mode may be mounted in the control method of the transfer optical device 220, the search mode may be set when the position of the observer 106 is unknown, the observer 106 may be found by two-dimensional scanning within the movable range of the transfer optical device 220, the position of the observer 106 may be specified, and then it may be switched to the tracking mode, so as to perform control of the transfer optical device 220.

The light emission unit may be arranged outside the system of the transfer optical device to illuminate the entire head of the observer 106, or although not illustrated, the light flux emitted from the image formation device and the light flux emitted from the light emission unit may be synthesized by a half mirror, incident on the transfer optical device, and emitted toward the optical device. Alternatively, a structure can be employed in which a light emission unit for a detection light is prepared in the image formation device, incident on the transfer optical device, and emitted toward the optical device.

Seventh Embodiment

A display device of a seventh embodiment is a display device in which the entire display device is arranged at a place different from the observer, the image formation device and the control unit and the optical device are further arranged at different places, and the observer observes an image displayed on the optical device. Conceptual views of the display device of the seventh embodiment are illustrated in FIGS. 23A and 23B.

Figure 23A:
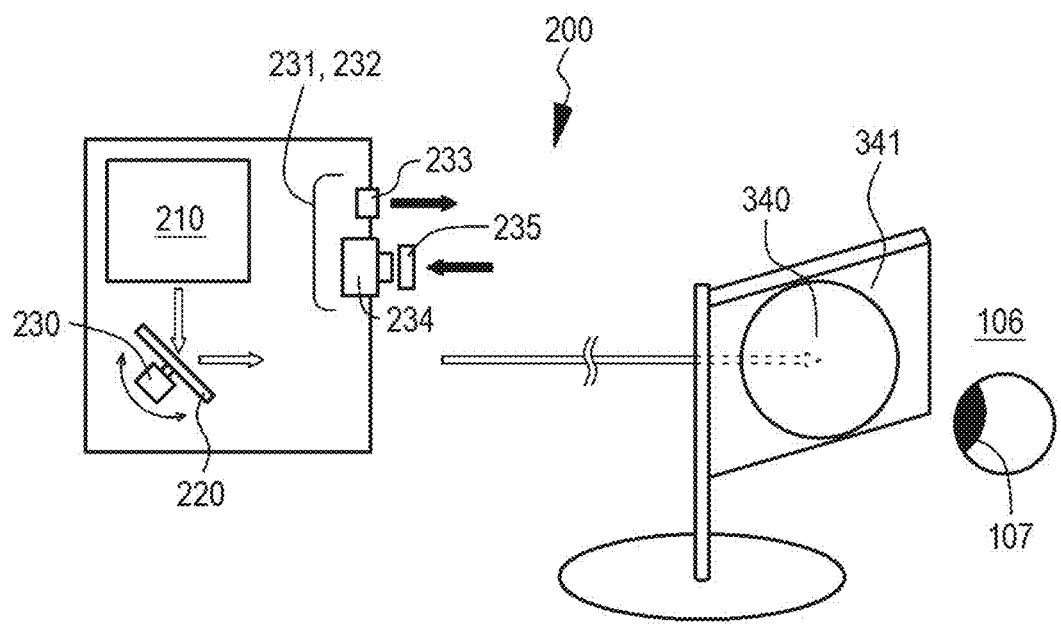
FIGS. 23A and 23B are conceptual views of a display device of a seventh embodiment and a modification example thereof.

As illustrated in a conceptual view in FIG. 23A, in the display device of the seventh embodiment, an optical device 340 and the image formation device 210 are relatively movable (that is, the image formation device 210 is arranged at a position away from the observer 106), and moreover, the optical device 340 is arranged at a position away from the observer 106. That is, the optical device 340 is not attached to the observer 106. The optical device 340 is a stationary type, is held by a holding member 341, or is incorporated into the holding member 341 integrally with the holding member 341. The holding member 341 and the optical device 340 are folded and stored when being carried, and the optical device 340 is set up when the display device is used. The transfer optical device 220 and the optical device 340 is only required to be adjusted in position at the time of setting up, and the positional relationship does not change during use. The image emitted from the image formation device 210 reaches the pupil 107 of the observer 106 via the optical device 340. As such a display device of the seventh embodiment, a retina projection type mini monitor can be mentioned. The optical device 340 has a similar configuration and structure to those of the optical device 240 described in the sixth embodiment.

Figure 23B:
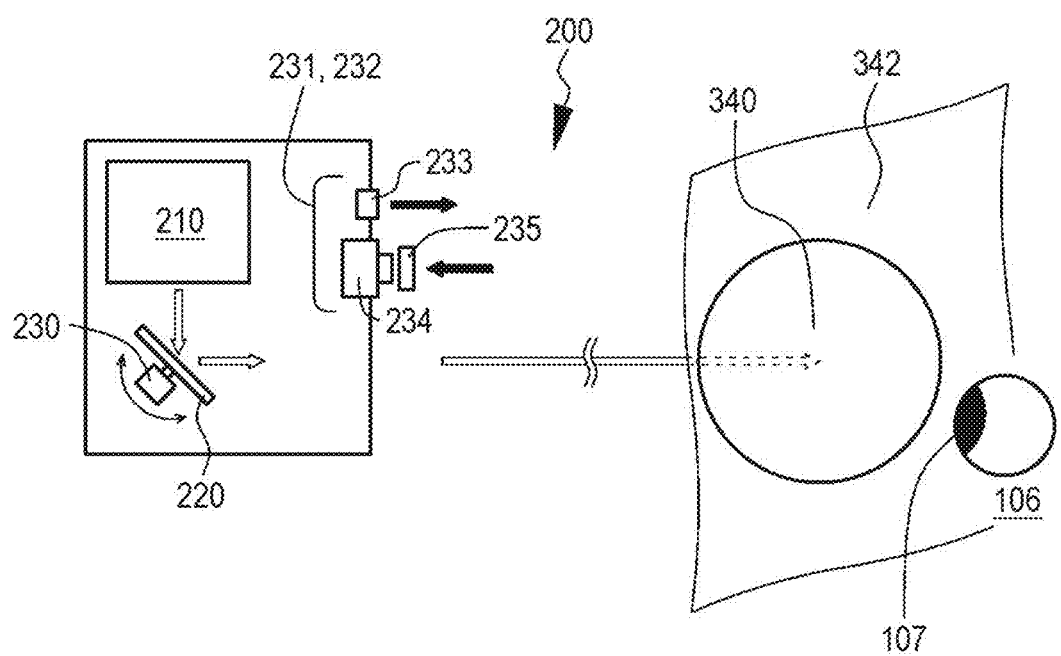

Alternatively, as illustrated in the conceptual view in FIG. 23B, the stationary optical device 340 is incorporated in a glass window 342 or an exhibition window of a museum, an art gallery, an observation platform, an aquarium, or the like, a windshield for an automobile, a full-face helmet, a protective face mask, or the like. Also in this case, the positions of the transfer optical device 220 and the optical device 340 do not change, and the image emitted from the image formation device 210 reaches the pupil 107 of the observer 106 via the optical device 340.

Examples in which the image display device is disposed in an external facility or the like in the display device of the seventh embodiment are (A) Example in which an image display device for a passenger is attached to a back surface of a back (backrest) of a seat of a vehicle or an aircraft (B) Example in which an image display device for a spectator is attached to a back surface of a back (backrest) of a seat of a theater or the like (C) Example in which an image display device for a driver or the like is attached to a vehicle, an aircraft, an automobile, a motorcycle, a bicycle, or the like (D) Example of use as an alternative to a monitor used in a personal computer, a mobile phone, a smartwatch, or the like (E) Example of use as an alternative to a display or a touch panel used in an automated teller machine in a financial institution (F) Example of use as an alternative to a display or a touch panel used in a store or an office (G) Example of enlarging and displaying the screen of a mobile phone or personal computer (H) Example of use as an alternative to a display plate or the like used in a museum, an amusement park, or the like (I) Example in which an image display device for a customer is attached to a table in a coffee shop, a cafe, or the like

Eighth Embodiment

Figure 24:
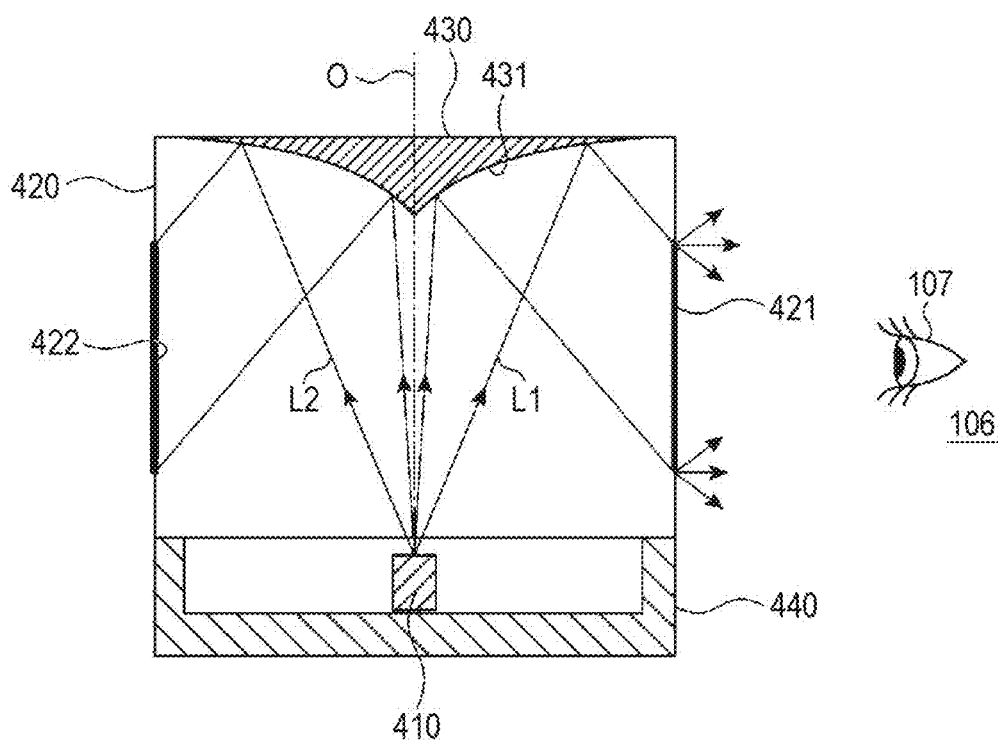
FIG. 24 is a schematic cross-sectional view of a display device of an eighth embodiment.
Figure 25A:
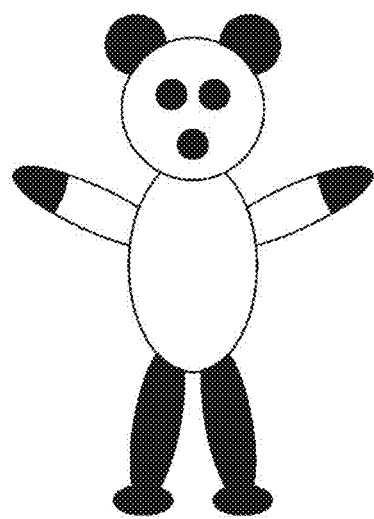
FIGS. 25A, 25B, and 25C are views for explaining a problem in a conventional display device.
Figure 25B:
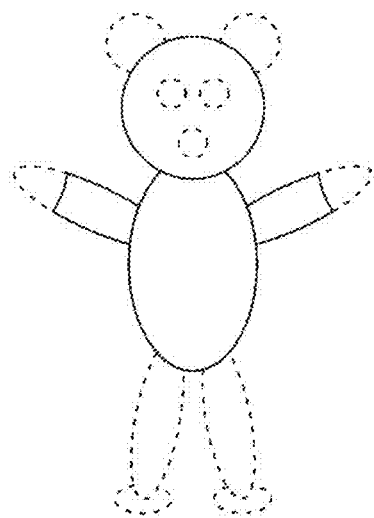
Figure 25C:
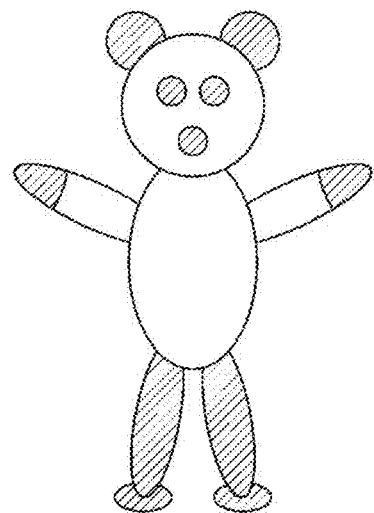

An eighth embodiment is a modification of the seventh embodiment. In a display device of the eighth embodiment whose schematic cross-sectional view is illustrated in FIG. 24, an image formation device 410 includes a projector, and an optical device 420 includes a cylindrical transparent screen. Then, a reflection mirror 430 is disposed at a top of the optical device 420.

As the projector constituting the image formation device 410, for example, a laser scanning type color projector that scans a laser light corresponding to each color of red, green, and blue to display each pixel, a mobile projector (pico projector), a projector using a monochromatic laser light, and the like can be mentioned, and is only required to be appropriately selected according to the size, application, and the like of the image display device.

The image formation device 410 projects an image onto an area 421 of the optical device 420 facing the observer 106 via the reflection mirror 430. Alternatively, the image formation device 410 projects an image onto the area 421 of the optical device 420 via the reflection mirror 430, and projects a background image onto an area 422 of the optical device 420 positioned on the opposite side of the area 421 of the optical device 420 via the reflection mirror 430. Note that, in FIG. 23, a light flux forming an image is denoted by a reference numeral "L1", and a light flux forming a background image is denoted by a reference numeral "L2". The image formation device 410 is installed upward at a substantially central portion of a cylindrical base 440. The image formation device 410 emits an image or an image and a background image with reference to an optical axis O extending in the vertical direction.

Specifically, the cylindrical transparent screen constituting the optical device 420 is formed by a hologram screen including a cylindrical transmission type hologram. In the transmission type hologram, for example, interference fringes of a diffused light by a diffusion plate are recorded, and the transmission type hologram has a diffusion function of diffusing an incident light. However, it is not limited thereto, and for example, a structure can be employed in which a light diffusion layer or the like that diffuses a light incident on the outer peripheral side of a transmission type hologram having no diffusion function is stacked. The image incident on the inside of the hologram screen is diffused (scattered) in various directions by the hologram screen and emitted toward the outside of the hologram screen. The material or the like of the transmission type hologram forming the hologram screen is not limited, and any photosensitive material or the like can be used. In addition, any holographic optical element (HOE) that functions as a transmission type hologram can also be appropriately used. Furthermore, a method of manufacturing the hologram screen by exposure is also not limited, and can be arbitrarily set regarding wavelengths, emission directions, and the like of the object light and the reference light. Alternatively, as the transparent screen, for example, a screen that diffuses a light using a scatterer such as fine particles, a Fresnel lens, a microlens, or the like can be mentioned. Furthermore, the transparent screen may be formed by a transparent display such as a transparent OLED using organic electro-luminescence (OLE). Alternatively, the transparent screen can be formed by any film, coat, or the like that can diffuse an image. When the hologram screen is exposed, the interference fringes can be formed by making the irradiation angle of the reference light constant. In such a monoslant hologram screen, it is possible to achieve high diffraction efficiency by making an image incident at the same incident angle as the irradiation angle of the reference light. For example, by using a monoslant transmission type hologram screen in which the irradiation angle of the reference light is set in accordance with the incident angle of the image controlled by a light reflection surface 431 of the reflection mirror 430 on the hologram screen, it is possible to achieve a hologram screen with very high luminance.

The reflection mirror 430 has the light reflection surface 431 that reflects the emitted light (image or background image) emitted from the image formation device 410. The reflection mirror 430 is arranged with reference to the optical axis O such that the light reflection surface 431 faces the image formation device 410, and the light reflection surface 431 has a shape rotated about the optical axis O. Specifically, the light reflection surface 431 includes a rotating surface obtained by rotating a curve obtained by cutting out a part of a parabola with reference to the optical axis O. The light reflection surface 431 is configured such that a concave side of the parabola (focal side of the parabola) is a side that reflects a light. The axis of the parabola and the optical axis O are different. As a material constituting the reflection mirror 430, any material such as a resin such as an acrylic resin, glass, a metal, an alloy, or the like can be mentioned. Furthermore, the light reflection surface 431 of the reflection mirror 430 may be coated with, for example, a high reflectance coating or the like using a thin film of aluminum, silver, or the like, so that the light incident on the light reflection surface 431 can be reflected with high efficiency.

The emitted light (image or background image) emitted upward from the image formation device 410 is reflected by the light reflection surface 431 of the reflection mirror 430 toward a side surface of the transparent cylindrical optical device 420. Since the light reflection surface 431 has a parabolic light reflection surface, the incident angle of the emitted light reflected by the light reflection surface 431 with respect to the inner side surface of the cylindrical transparent screen constituting the optical device 420 is substantially constant. That is, the incident angle of the emitted light with respect to the cylindrical optical device 420 is controlled to be substantially constant by the reflection mirror 430. Then, image unevenness and the like due to incident angle selectivity of the hologram screen can thus be sufficiently suppressed, and consequently, a high-quality image can be displayed on the transparent screen using the hologram screen. Furthermore, since there is no need to correct an image signal or the like, it is possible to project an image with original irradiation intensity, and it is thereby possible to display a bright image. That is, visibility of the image can be improved.

Furthermore, the image and the background image reflected downward by the reflection mirror 430 arranged above are incident on the transparent screen. Therefore, in a case where the transmission type hologram screen is formed in accordance with the incident angle of the image or the background image, an external light or the like incident on a display surface of the transparent screen is directly transmitted through the transparent screen. Thus, for example, it is possible to sufficiently suppress a phenomenon that light of a lighting or the like is reflected on the display surface of the transparent screen. Consequently, it is possible to reduce the influence of external light or the like on an image displayed on the transparent screen, and it is possible to achieve sufficiently high-quality image display.

Furthermore, a detection camera (not illustrated) may be arranged to detect a viewpoint position of the observer 106. The position and the angle of view of the detection camera are preferably set so that the entire observation range for observing the image can be captured. The detection camera can capture an image of the face of the observer 106 at an arbitrary position in the observation range. For example, the detection camera may be installed on the base 440 or may be installed at any position above the base. Furthermore, a plurality of detection cameras may be installed. Then, the control unit can control the display position of the image in the optical device 420 on the basis of the viewpoint position.

In some cases, the reflection mirror 430 can be omitted, and the image formation device 410 can directly project the image on the area 421 of the optical device 420 facing the observer 106, and directly project the background image on the area 422 of the optical device 420 facing the observer 106. Furthermore, the light reflection surface 431 of the reflection mirror 430 can be a conical side surface instead of a parabolic rotating surface.

Although the display device of the present disclosure has been described above on the basis of preferred embodiments, the display device of the present disclosure is not limited to these embodiments. The configuration and structure of the display device, and the configuration and structure of the image display device, the image formation device, the optical device, the eyepiece optical device, or the transfer optical device can be appropriately changed.

A color (green) having a complementary color relationship with a color (for example, red) of a portion (hereinafter referred to as an "adjacent image portion" for convenience) of an image adjacent to the black display edge may be added to the adjacent image portion to emphasize a boundary between the black display edge and the adjacent image portion. Furthermore, the various processes described in the embodiment may be performed on the all black display edge, or the various processes described in the embodiment may be performed on a part of the black display edge. Furthermore, processing may be performed in which, in a case where the image emitted from the image formation device is displayed at a position far from the observer in a virtual image space, the control unit reduces a luminance change amount when performing the luminance increasing processing, and in a case where the image is displayed at a position close to the observer in the virtual image space, the control unit increases the luminance change amount when performing the luminance increasing processing. That is, the control unit may control the luminance change amount at the time of performing the luminance increasing processing on the basis of the depth information related to the image.

In the sixth to eighth embodiments, for example, in a case where the observer is at an inappropriate place as viewed from the display device, the display device may provide guidance by voice or image/video for guiding the observer to an appropriate place. The display device may include a plurality of image formation devices. That is, a configuration can be employed in which the display device includes a plurality of image formation devices having different positions at which images are emitted, and emits the same image from the plurality of image formation devices and receives one image out of the plurality of images by one eyepiece optical device. Then, the degree of freedom of the relative positional relationship between the image formation device and the observer can thus be increased. That is, for example, when the observer is located at a predetermined position, the image from the image formation device reaches the eyepiece optical device and the observer can observe the image through the eyepiece optical device, and this predetermined position can be enlarged.

Furthermore, for example, a surface relief type hologram (see US 2004/0062505 A1) may be arranged on the light guide plate, or a surface relief type diffraction grating member disclosed in U.S. Pat. No. 9,513,480 B2 (US 2016/0231568 A1) can be used as the diffraction grating member. A mode can be employed in which one of the first deflection means and the second deflection means includes a reflection type diffraction grating member, and the other includes a transmission type diffraction grating member. Alternatively, the diffraction grating member can be a reflective blazed diffraction grating member, or a hologram diffraction grating can be formed by a polymer dispersed liquid crystal (PDLC) mixture disclosed in Japanese Patent Application Laid-Open No. 2014-132328.

The image formation device may be a display device that displays an image of a single color (for example, green), or can display a color image. In the latter case, the light source is only required to include, for example, a light source that emits each of red, green, and blue. More specifically, for example, the white light is only required to be obtained by mixing a red light, a green light, and a blue light emitted from a red light emitting element, a green light emitting element, and a blue light emitting element using a light pipe and uniformizing luminance.

Note that the present disclosure can also employ the following configurations.

[A01] <<Display Device: First Aspect>>

A display device including an image display device and a control unit, in which the image display device includes an image formation device, and an optical device that displays an image emitted from the image formation device in front of an observer while superimposing the image on a real image of an outside world, the control unit controls an operation of the image formation device, and in a case where a black display edge that is an edge of an area where black is displayed exists in the image, the control unit performs reversing processing and luminance increasing processing of the black display edge.

[A02] The display device according to [A01], further including an illuminance measurement device that measures illuminance of an outside world, in which the control unit performs the luminance increasing processing of the black display edge on the basis of an illuminance measurement result of the illuminance measurement device.

[A03] The display device according to [A01] or

[A02], in which the control unit obtains an image of the black display edge obtained by performing reversing processing and performing resolution reduction on the image, and thereafter performs combining processing of the image of the black display edge obtained by performing the luminance increasing processing on the image of the black display edge and an original image.

[A04] The display device according to [A01] or

[A02], in which the control unit obtains an image of the black display edge obtained by performing reversing processing and performing resolution reduction on the image, thereafter performs blurring processing, and performs combining processing of the image of the black display edge obtained by performing the luminance increasing processing on the image of the black display edge and an original image.

[A05] The display device according to any one of [A01] to [A04], further including a line-of-sight information acquisition unit that acquires line-of-sight information of the observer, in which the control unit performs the luminance increasing processing of the black display edge included in a gaze point of the observer and a vicinity thereof.

[A06] The display device according to any one of [A01] to [A05], in which information of the image includes information of transmittance, and the control unit performs the luminance increasing processing of the black display edge on the basis of the information of transmittance.

[A07] The display device according to any one of [A01] to [A06], further including a spatial frequency measurement unit that obtains a spatial frequency of the real image of the outside world in a superimposed area of the image and the real image of the outside world, in which the control unit performs the luminance increasing processing of the black display edge on the basis of a measurement result of the spatial frequency.

[A08] The display device according to any one of [A01] to [A07], in which the control unit adds a color having a complementary color relationship with a color of a portion ("adjacent image portion") of an image adjacent to the black display edge to the adjacent image portion to emphasize a boundary between the black display edge and the adjacent image portion.

[A09] The display device according to any one of [A01] to [A08], in which in a case where the image emitted from the image formation device is displayed at a position far from the observer in a virtual image space, the control unit reduces a luminance change amount when performing the luminance increasing processing, and in a case where the image is displayed at a position close to the observer in the virtual image space, the control unit increases the luminance change amount when performing the luminance increasing processing.

[B01] <<Display Device: Second Aspect>>

A display device including an image display device and a control unit, in which the image display device includes an image formation device, and an optical device that displays an image emitted from the image formation device in front of an observer while superimposing the image on a real image of an outside world, the control unit controls an operation of the image formation device, and in a case where a black display edge that is an edge of an area where black is displayed exists in the image, the control unit performs luminance increasing processing of a background image to be superimposed on a background portion including the image.

[B02] The display device according to [B01], further including an illuminance measurement device that measures illuminance of an outside world, in which the control unit performs the luminance increasing processing of the background image on the basis of an illuminance measurement result of the illuminance measurement device.

[B03] The display device according to [B01] or [B02], in which information of the image includes information of transmittance, and the control unit performs the luminance increasing processing of the background image on the basis of the information of transmittance.

[B04] The display device according to any one of [B01] to [B03], further including a spatial frequency measurement unit that obtains a spatial frequency of the real image of the outside world in a superimposed area of the image and the real image of the outside world, in which the control unit performs the luminance increasing processing of the background image on the basis of a measurement result of the spatial frequency.

[C01] <<Display Device: Third Aspect>>

A display device including an image display device and a control unit, in which the image display device includes an image formation device, and an optical device that displays an image emitted from the image formation device in front of an observer while superimposing the image on a real image of an outside world, the control unit controls an operation of the image formation device, and in a case where a black display edge that is an edge of an area where black is displayed exists in the image, the control unit performs luminance increasing processing of a background image to be superimposed on a background portion including the black display edge.

[C02] The display device according to [C01], further including an illuminance measurement device that measures illuminance of an outside world, in which the control unit performs the luminance increasing processing of the background image on the basis of an illuminance measurement result of the illuminance measurement device.

[C03] The display device according to [C01] or [C02], in which information of the image includes skeleton information (feature point in the image), and the control unit performs processing of superimposing the background image on the background portion including the black display edge on the basis of the information of the image and the skeleton information (feature point in the image).

[C04] The display device according to [C03], in which the control unit performs processing of superimposing the background image on the background portion including the black display edge on the basis of the information of the image and information regarding joints (feature point in the image) in the skeleton information.

[C05] The display device according to any one of [C01] to [C04], in which information of the image includes information of transmittance, and the control unit performs the luminance increasing processing of the background image on the basis of the information of transmittance.

[C06] The display device according to any one of [C01] to [C05], further including a spatial frequency measurement unit that obtains a spatial frequency of the real image of the outside world in a superimposed area of the image and the real image of the outside world, in which the control unit performs the luminance increasing processing of the background image on the basis of a measurement result of the spatial frequency.

[D01] <<Display Device: Fourth Aspect>>

A display device including an image display device for a right eye, an image display device for a left eye, and a control unit, in which each of the image display devices includes an image formation device, and an optical device that displays an image emitted from the image formation device in front of an observer while superimposing the image on a real image of an outside world, the control unit controls operations of the image formation device for the right eye and the image formation device for the left eye, in a case where a black display edge that is an edge of an area where black is displayed exists in the image, the control unit performs processing of superimposing a background image on a background portion of the image in the image display device for the right eye and performs processing of superimposing a background image on a background portion of the image in the image display device for the left eye, and the control unit displays the background image with reference to a portion of the image displayed at a position farthest from the observer in a virtual image space.

[E01] <<Display Method: First Aspect>>

A display method in a display device including an image display device and a control unit, in which the image display device includes an image formation device, and an optical device that displays an image emitted from the image formation device in front of an observer while superimposing the image on a real image of an outside world, and in a case where a black display edge that is an edge of an area where black is displayed exists in the image, the method includes performing, by a control unit, reversing processing and luminance increasing processing of the black display edge.

[E02] The display method according to [E01], in which the luminance increasing processing of the black display edge is performed on the basis of an illuminance measurement result.

[E03] The display method according to [E01] or [E02], further including obtaining an image of the black display edge obtained by performing reversing processing and performing resolution reduction on the image, and thereafter performing combining processing of the image of the black display edge obtained by performing the luminance increasing processing on the image of the black display edge and an original image.

[E04] The display method according to [E01] or [E02], further including obtaining an image of the black display edge obtained by performing reversing processing and performing resolution reduction on the image, thereafter performing blurring processing, and performing combining processing of the image of the black display edge obtained by performing the luminance increasing processing on the image of the black display edge and an original image.

[E05] The display method according to any one of [E01] to [E04], further including performing the luminance increasing processing of the black display edge included in a gaze point of the observer and a vicinity thereof.

[E06] The display method according to any one of [E01] to [E05], further including performing the luminance increasing processing of the black display edge on the basis of information of transmittance.

[E07] The display method according to any one of [E01] to [E06], further including obtaining a spatial frequency of the real image of the outside world in a superimposed area of the image and the real image of the outside world is obtained, and performing the luminance increasing processing of the black display edge on the basis of a result thereof.

[E08] The display method according to any one of [E01] to [E07], further including adding a color having a complementary color relationship with a color of a portion ("adjacent image portion") of an image adjacent to the black display edge to the adjacent image portion to emphasize a boundary between the black display edge and the adjacent image portion.

[E09] The display method according to any one of [E01] to [E08], further including, in a case where the image emitted from the image formation device is displayed at a position far from the observer in a virtual image space, reducing a luminance change amount when performing the luminance increasing processing, and in a case where the image is displayed at a position close to the observer in the virtual image space, increasing the luminance change amount when performing the luminance increasing processing.

[F01] <<Display Method: Second Aspect>>

A display method in a display device including an image display device and a control unit, in which the image display device includes an image formation device, and an optical device that displays an image emitted from the image formation device in front of an observer while superimposing the image on a real image of an outside world, and in a case where a black display edge that is an edge of an area where black is displayed exists in the image, the method includes performing, by a control unit, luminance increasing processing of a background image to be superimposed on a background portion including the image.

[F02] The display method according to [F01], in which the luminance increasing processing of the background image is performed on the basis of an illuminance measurement result.

[F03] The display method according to [F01] or [F02], in which the luminance increasing processing of the background image is performed on the basis of information of transmittance.

[F04] The display method according to any one of [F01] to [F03], further including obtaining a spatial frequency of the real image of the outside world in a superimposed area of the image and the real image of the outside world is obtained, and performing the luminance increasing processing of the background image on the basis of a result thereof.

[G01] <<Display Device: Third Aspect>>

A display method in a display device including an image display device and a control unit, in which the image display device includes an image formation device, and an optical device that displays an image emitted from the image formation device in front of an observer while superimposing the image on a real image of an outside world, and in a case where a black display edge that is an edge of an area where black is displayed exists in the image, the method includes performing, by a control unit, luminance increasing processing of a background image to be superimposed on a background portion including the black display edge.

[G02] The display method according to [G01], in which the luminance increasing processing of the background image is performed on the basis of an illuminance measurement result.

[G03] The display method according to [G01] or [G02], in which information of the image includes skeleton information, and the method further includes performing processing of superimposing the background image on the background portion including the black display edge on the basis of the information of the image and the skeleton information.

[G04] The display method according to [G03], further including performing processing of superimposing the background image on the background portion including the black display edge on the basis of the information of the image and information regarding joints (feature point in the image) in the skeleton information.

[G05] The display method according to any one of [G01] to [G04], in which the luminance increasing processing of the background image is performed on the basis of information of transmittance.

[G06] The display method according to any one of [G01] to [G05], further including obtaining a spatial frequency of the real image of the outside world in a superimposed area of the image and the real image of the outside world is obtained, and performing the luminance increasing processing of the background image on the basis of a result thereof.

REFERENCE SIGNS LIST 100, 100R, 100L, 200, 410 Image display device
101 Control unit
102 Illuminance measurement device
103 Line-of-sight information acquisition unit [eye tracking device (eye tracking camera)]
104 Spatial frequency measurement unit [for example, imaging device (or camera)]
105 Pupil diameter measurement unit
106 Observer
107, 107R, 107L Pupil of observer
110, 110R, 110L, 210, 410 Image formation device
112 Housing
120 Optical device (eyepiece optical device)
121 Light guide plate
122 First surface of light guide plate
123 Second surface of light guide plate
131 First deflection means
132 Second deflection means
140 Frame
140' Nose pad portion
141 Front portion
142 Hinge
143 Temple portion
144 Temple tip (tip cell, earpiece, ear pad)
145 Wiring (signal line, power line, or the like)
146 Headphone part
146' Wiring for headphone part
147 Camera
148 Attachment member
220 Transfer optical device
230 Transfer optical device-control device
231 First position detection device
232 Second position detection device
233 Light emission unit
234 Light reception unit
235 Filter (infrared transmission filter)
240 Optical device (eyepiece optical device)
241 Retroreflective marker
242 Diffraction member
243 Light collecting member
340 Optical device
341 Holding member
342 Glass window
410 Image formation device
420 Optical device
421 Area of optical device facing observer
422 Area of optical device located on side opposite to area of optical device facing observer
430 Reflection mirror
431 Light reflection surface of reflection mirror
440 Base
$R_1$ Light ray corresponding to right end of image and background image viewed with right eye of observer
$R_2$ Light ray corresponding to left end of image and background image viewed with right eye of observer
$L_1$ Light ray corresponding to left end of image and background image viewed with left eye of observer
$L_2$ Light ray corresponding to left end of image and background image viewed with left eye of observer
$BG_R$ Background image viewed with right eye of observer
$BG_L$ Background image viewed with left eye of observer
BG Background image viewed with both eyes of observer
L1 Light flux forming image
L2 Light flux forming background image

What is claimed is:

1. A display device comprising:
an image display device; and
a control unit,
wherein the image display device includes:
an image formation device; and
an optical device that displays an image emitted from the image formation device in front of an observer while superimposing the image on a real image of an outside world,
wherein the control unit controls an operation of the image formation device, and
wherein, in a case where a black display edge that is an edge of an area where black is displayed exists in the image, the control unit performs reversing processing and luminance increasing processing of the black display edge, and
wherein the control unit obtains an image of the black display edge obtained by performing reversing processing and by performing resolution reduction on the image, and thereafter performs combining processing of the image of the black display edge obtained by performing the luminance increasing processing on the image of the black display edge and an original image.

2. The display device according to claim 1, further comprising an illuminance measurement device that measures illuminance of an outside world,
wherein the control unit performs the luminance increasing processing of the black display edge on a basis of an illuminance measurement result of the illuminance measurement device.

3. A display device, comprising:
an image display device; and
a control unit,
wherein the image display device includes:
an image formation device; and
an optical device that displays an image emitted from the image formation device in front of an observer while superimposing the image on a real image of an outside world,
wherein the control unit controls an operation of the image formation device, and wherein, in a case where a black display edge that is an edge of an area where black is displayed exists in the image, the control unit performs reversing processing and luminance increasing processing of the black display edge, and wherein the control unit obtains an image of the black display edge obtained by performing reversing processing and performing resolution reduction on the image, thereafter performs blurring processing, and performs combining processing of the image of the black display edge obtained by performing the luminance increasing processing on the image of the black display edge and an original image.

4. A display device, comprising:
an image display device;
a control unit,
wherein the image display device includes:
  an image formation device; and
  an optical device that displays an image emitted from the image formation device in front of an observer while superimposing the image on a real image of an outside world,
wherein the control unit controls an operation of the image formation device, and
wherein, in a case where a black display edge that is an edge of an area where black is displayed exists in the image, the control unit performs reversing processing and luminance increasing processing of the black display edge; and
a line-of-sight information acquisition unit that acquires line-of-sight information of the observer,
wherein the control unit performs the luminance increasing processing of the black display edge included in a gaze point of the observer and a vicinity thereof.

5. A display device, comprising:
an image display device; and
a control unit,
wherein the image display device includes:
  an image formation device; and
  an optical device that displays an image emitted from the image formation device in front of an observer while superimposing the image on a real image of an outside world,
wherein the control unit controls an operation of the image formation device, and
wherein, in a case where a black display edge that is an edge of an area where black is displayed exists in the image, the control unit performs reversing processing and luminance increasing processing of the black display edge,
wherein information of the image includes information of transmittance, and
wherein the control unit performs the luminance increasing processing of the black display edge on a basis of the information of transmittance.

6. A display device, comprising:
an image display device;
a control unit,
wherein the image display device includes:
  an image formation device; and
  an optical device that displays an image emitted from the image formation device in front of an observer while superimposing the image on a real image of an outside world,
wherein the control unit controls an operation of the image formation device, and wherein, in a case where a black display edge that is an edge of an area where black is displayed exists in the image, the control unit performs reversing processing and luminance increasing processing of the black display edge; and
a spatial frequency measurement unit that obtains a spatial frequency of the real image of the outside world in a superimposed area of the image and the real image of the outside world,
wherein the control unit performs the luminance increasing processing of the black display edge on a basis of a measurement result of the spatial frequency.

7. A display device comprising:
an image display device; and
a control unit,
wherein the image display device includes:
  an image formation device; and
  an optical device that displays an image emitted from the image formation device in front of an observer while superimposing the image on a real image of an outside world,
wherein the control unit controls an operation of the image formation device,
wherein in a case where a black display edge that is an edge of an area where black is displayed exists in the image, the control unit performs luminance increasing processing of a background image to be superimposed on a background portion including the image,
wherein information of the image includes information of transmittance, and
wherein the control unit performs the luminance increasing processing of the background image on a basis of the information of transmittance.

8. The display device according to claim 7, further comprising an illuminance measurement device that measures illuminance of an outside world,
wherein the control unit performs the luminance increasing processing of the background image on a basis of an illuminance measurement result of the illuminance measurement device.

9. A display device, comprising:
an image display device;
a control unit,
wherein the image display device includes:
  an image formation device; and
  an optical device that displays an image emitted from the image formation device in front of an observer while superimposing the image on a real image of an outside world,
wherein the control unit controls an operation of the image formation device,
wherein in a case where a black display edge that is an edge of an area where black is displayed exists in the image, the control unit performs luminance increasing processing of a background image to be superimposed on a background portion including the image; and
a spatial frequency measurement unit that obtains a spatial frequency of the real image of the outside world in a superimposed area of the image and the real image of the outside world,
wherein the control unit performs the luminance increasing processing of the background image on a basis of a measurement result of the spatial frequency.

10. A display device comprising:
an image display device; and
a control unit, wherein the image display device includes
an image formation device, and
an optical device that displays an image emitted from the image formation device in front of an observer while superimposing the image on a real image of an outside world,
wherein the control unit controls an operation of the image formation device, and
wherein, in a case where a black display edge that is an edge of an area where black is displayed exists in the image, the control unit performs luminance increasing processing of a background image to be superimposed on a background portion including the black display edge.

11. The display device according to claim 10, further comprising an illuminance measurement device that measures illuminance of an outside world,
wherein the control unit performs the luminance increasing processing of the background image on a basis of an illuminance measurement result of the illuminance measurement device.

12. The display device according to claim 10, wherein information of the image includes skeleton information, and
the control unit performs processing of superimposing the background image on the background portion including the black display edge on a basis of the information of the image and the skeleton information.

13. The display device according to claim 12, wherein the control unit performs processing of superimposing the background image on the background portion including the black display edge on a basis of the information of the image and information regarding joints in the skeleton information.

14. The display device according to claim 10, wherein information of the image includes information of transmittance, and
the control unit performs the luminance increasing processing of the background image on a basis of the information of transmittance.

15. The display device according to claim 10, further comprising a spatial frequency measurement unit that obtains a spatial frequency of the real image of the outside world in a superimposed area of the image and the real image of the outside world,
wherein the control unit performs the luminance increasing processing of the background image on a basis of a measurement result of the spatial frequency.

16. A display device, comprising:
an image display device for a right eye;
an image display device for a left eye; and
a control unit,
wherein each of the image display devices includes:
an image formation device, and
an optical device that displays an image emitted from the image formation device in front of an observer while superimposing the image on a real image of an outside world,
wherein the control unit controls operations of the image formation device for the right eye and the image formation device for the left eye,
wherein, in a case where a black display edge that is an edge of an area where black is displayed exists in the image, the control unit performs processing of superimposing a background image on a background portion of the image in the image display device for the right eye and performs processing of superimposing a background image on a background portion of the image in the image display device for the left eye, and
wherein the control unit displays the background image with reference to a portion of the image displayed at a position farthest from the observer in a virtual image space.

* * * * *